US007024263B2

(12) United States Patent
Drake, Jr. et al.

(10) Patent No.: US 7,024,263 B2
(45) Date of Patent: Apr. 4, 2006

(54) MECHANICAL TOLERANCE METHOD

(76) Inventors: Paul J. Drake, Jr., 2417 Canyon Creek Dr., Richardson, TX (US) 75080; Dale L. Van Wyk, 7301 Moss Ridge Rd., Parker, TX (US) 75002

( * ) Notice: Subject to any disclaimer, the term of this patent is extended or adjusted under 35 U.S.C. 154(b) by 47 days.

(21) Appl. No.: 10/627,177

(22) Filed: Jul. 25, 2003

(65) Prior Publication Data

US 2004/0030427 A1 Feb. 12, 2004

Related U.S. Application Data

(60) Provisional application No. 60/398,435, filed on Jul. 25, 2002.

(51) Int. Cl.
*G06F 19/00* (2006.01)

(52) U.S. Cl. ............................ 700/97; 700/103; 703/1

(58) Field of Classification Search .................. 700/97, 700/103, 95, 109; 702/179, 81; 703/1; 717/126
See application file for complete search history.

(56) References Cited

U.S. PATENT DOCUMENTS 5,323,333 A * 6/1994 Johnson ......................... 703/1
5,581,466 A 12/1996 Van Wyk et al. ....... 364/468.01
5,586,052 A 12/1996 Iannuzzi et al. ............ 364/512
5,956,251 A * 9/1999 Atkinson et al. ........... 700/109
6,253,115 B1 6/2001 Martin et al. ................. 700/97
6,477,471 B1 11/2002 Hedstrom et al. ............ 702/34
6,571,202 B1 5/2003 Loman et al. ................. 703/2
2004/0015871 A1* 1/2004 Kamatala et al. ........... 717/126

* cited by examiner

*Primary Examiner*—Leo Picard
*Assistant Examiner*—Steven R. Garland
(74) *Attorney, Agent, or Firm*—Michael Diaz

(57) ABSTRACT

A mechanical tolerance method which links mechanical assembly tolerancing requirements to part variation controls. The method optimizes tolerance for a design. The method begins by a user defining an assembly requirement. Next, datum features are defined. The method then moves to the step of assigning component dimensions. A dimensional loop diagram is generated for each component. Next, an appropriate analysis/allocation method for determining tolerances of the components is determined. Upon selecting the appropriate process, variation controls are applied to the plurality of components. Next, tolerances are assigned to features of the components.

38 Claims, 42 Drawing Sheets

FIG. 8

| | | | | |
|---|---|---|---|---|
| FIG. 8.1 | FIG. 8.6 | FIG. 8.11 | FIG. 8.16 | FIG. 8.21 |
| FIG. 8.2 | FIG. 8.7 | FIG. 8.12 | FIG. 8.17 | FIG. 8.22 |
| FIG. 8.3 | FIG. 8.8 | FIG. 8.13 | FIG. 8.18 | FIG. 8.23 |
| FIG. 8.4 | FIG. 8.9 | FIG. 8.14 | FIG. 8.19 | FIG. 8.24 |
| FIG. 8.5 | FIG. 8.10 | FIG. 8.15 | FIG. 8.20 | FIG. 8.25 |

| "Feature" Type | Controlled Element of Feature | Tolerance Zone Shape |
|---|---|---|
| Planar | Independent line elements of surface | Parallel lines |
| | Single surface | Parallel planes |
| | | Wedge |
| | More than one surface | Parallel planes |

FIG. 8.1

| | | |
|---|---|---|
| | | |
| Conical | Two opposed points | Width |
| | Line element of surface | Parallel lines |
| | Circular elements of surface | Concentric circles |
| | Entire surface | Equidistant Profiles |
| Radial | Radial line elements of a surface | Concentric arcs (lines) |
| | Entire surface (flats and reversals allowed) | Min/max radius arc |
| | | Concentric arcs (contours) |
| | Entire surface (no flats or reversals allowed) | Min/max radius arc |
| | | Concentric arcs |
| Cylindrical | Two opposed points | Width |

FIG. 8.2

| | | |
|---|---|---|
| | Line element(s) of a surface | Parallel lines |
| | Circular elements of surface | Concentric circles |
| | Entire surface | MMC boundary and LMC size width |
| | | Concentric cylinders |
| Axis | Derived median points | Cylinder |
| | Derived median line | Cylinder |
| | Axis of actual mating envelope | Parallel planes |
| | | Cylinder |

FIG. 8.3

| | | |
|---|---|---|
| | | |
| Width | Two opposed points | Width |
| | Two opposed lines | MMC boundary and LMC size width |
| | Two opposed planes | MMC boundary and LMC size width |
| | Twp angled surfaces | Wedge |
| Center plane | Derived median line | Parallel lines |
| | Derived median plane | Parallel planes |
| | Center plane of actual mating envelope | |
| Revolute (that is not cylindrical or conical) | Two opposed points | Width |
| | Circular elements of surface | Concentric circles |
| | Line elements of surface | Equidistant 2-D boundaries |

FIG. 8.4

| | | |
|---|---|---|
| | Entire surface | Equidistant 3-D boundaries |
| Spherical | Two opposed points | Width |
| | Entire surface | MMC boundary with LMC size width |
| | | Concentric spheres |
| Point | Derived median points | Spherical diameter |
| | Center point of actual mating envelope | |
| Surfaces | Independent surface cross sections | Equidistant, 2-D boundaries |
| | Entire surface | Equisistant cross sectional profiles |
| | | Equidistant profiles |
| User defined | User defined | User defined |

Note, all of the variation controls may have the statistical tolerancing symbol next to the tolerance

FIG. 8.5

None

| **Type of Control** | **Placement of Control*** | **Material Condition Modifier** | **Variation Control** |
|---|---|---|---|
| Surface Straightness | b,c | - | [— \| TOL] |
| Flatness | b,c | - | [▱ \| TOL] |
| | | | |
| Surface Profile (surface to surface location)<br><br>(coplanarity) | b | - | [⌓ \| TOL]<br><br>n SURFACES |

FIG. 8.6

| | | | |
|---|---|---|---|
| | | | |
| Dimension(s), but not very well defined | - | - | DIM±TOL |
| Line Profile (form) | b | - | ⌒ TOL |
| Circularity | b | - | ○ TOL |
| Surface Profile (form) | b | - | ⌓ TOL |
| Line Profile (form) | b | - | ⌒ TOL |
| Radius symbol (R) without a center | - | - | R |
| Radius symbol (R) with center | - | - | R |
| Surface Profile (form) | b | - | ⌓ TOL |
| Controlled Radius symbol (CR) without a center | - | - | CR |
| Controlled Radius symbol (CR) with center | - | - | CR |
| Size dimension and nullify Rule 1 | - | - | ∅DIM±TOL Perfect form at MMC not required. |

FIG. 8.7

| | | | |
|---|---|---|---|
| - | - | - | |
| Surface straightness | b | - | — TOL |
| Circularity | a,b,d | - | ○ TOL |
| Line Profile (form) | b | - | ⌒ TOL |
| Size dimension | - | - | ØDIM±TOL |
| Cylindricity | a,b,d | - | ⌭ TOL |
| Surface Profile (form) | b | - | ⌓ TOL |
| - | - | - | - |
| Axis Straightness | a,d | RFS | — ØTOL |
| | | MMC | — ØTOLⓂ |
| | | LMC | — ØTOLⓁ |
| - | - | - | - |
| - | - | - | - |

FIG. 8.8

| | | | |
|---|---|---|---|
| | | | |
| Size dimension and nullify Rule 1 | - | - | DIM±TOL<br>Perfect form at MMC not required. |
| Size dimension | - | - | DIM±TOL |
| Size dimension | - | - | DIM±TOL |
| Angle dimension | - | - | DIM±TOL |
| Median Line Straightness | a,d | RFS | \|—\|TOL\| |
| | | MMC | \|—\|TOL Ⓜ\| |
| | | LMC | \|—\|TOL Ⓛ\| |
| Median Plane Flatness | a,d | RFS | \|▱\|TOL\| |
| | | MMC | \|▱\|TOL Ⓜ\| |
| | | LMC | \|▱\|TOL Ⓛ\| |
| - | - | - | - |
| Dimension(s), but not very well defined | - | - | DIM±TOL |
| Circularity | b | - | \|○\|TOL\| |
| Line Profile (form) | b | - | \|⌒\|TOL\| |

FIG. 8.9

| | | | |
|---|---|---|---|
| Surface Profile (form) | b | - | ⌓ TOL |
| Size dimension and nullify Rule 1 | b,d | - | SØ DIM±TOL<br><br>Perfect form at MMC not required. |
| Size dimension | - | - | SØ DIM±TOL<br>SR DIM±TOL |
| Circularity | a,b,d | - | ○ TOL |
| - | - | - | |
| - | - | - | |
| Line Profile (form) | b | - | ⌒ TOL<br>with all around symbol |
| Surface Profile (form and surface to surface) | b | - | ⌓ TOL<br>with all around symbol |
| Surface Profile (form and surface to surface) | b | - | ⌓ TOL<br>ALL OVER |
| User defined | User defined | User defined | User defined |

* Placement of Control
a) below or attached to a leader directed callout or dimension
b) leader from control to feature
c) attach to an extension line (planar features only)

d) attached to an extension of the dimension line

FIG. 8.10

Relationship of tolerance zone to Datum Reference Frame

| | Oriented | | |
|---|---|---|---|
| **Dim(s)** | **Type of Control** | **Placement of Control*** | **Material Condition Modifier** |
| None | Parallelism – Line elements | b,c | - |
| | Perpendicularity – Line elements | b,c | - |
| | Angularity – Line elements | b,c | - |
| | Line Profile (orientation) | b | - |
| None | Parallelism | b,c | - |
| | Perpendicularity | b,c | - |
| | Angularity | b,c | - |
| | Angular dijmension | - | - |
| | Surface Profile (orientation) | b | - |
| | Angular dimension | - | - |
| Zero basic shown with extension line | Parallelism | b,c | - |

FIG. 8.11

| | | | |
|---|---|---|---|
| | Perpendicularity | b,c | - |
| | Angularity | b,c | - |
| | Surface Profile (orientation and surface to surface) (typically lower tier of composite Profile) | b | - |
| None | - | - | - |
| None | Angularity – Line elements | b,c | - |
| | Line Profile (orientation) | b | - |
| None | - | - | - |
| None | Surface Profile (orientation) | b | - |
| Radius | Line Profile (orientation) | b | - |
| None | - | - | - |
| None | Surface Profile (orientation) | b | - |
| None | | | |
| None | - | - | - |
| None | - | - | - |
| None | - | - | - |

FIG. 8.12

| | | | |
|---|---|---|---|
| None | Parallelism – Line elements (surface) | b,c | - |
| None | Perpendicularity – Line elements (surface) | b,c | - |
| | Angularity – Line elements (surface) | b,c | - |
| None | Line Profile (orientation) | b | - |
| None | | | |
| None | - | - | - |
| None | Surface Profile (orientation) | b | - |
| None | | | |
| - | - | - | - |
| None | - | - | - |
| - | Parallelism | a,d | RFS |
| | | | MMC |
| | | | LMC |
| | Perpendicularity | a,d | RFS |
| | | | MMC |
| | | | LMC |
| | Angularity | a,d | RFS |
| | | | MMC |
| | | | LMC |
| - | Parallelism | a,d | RFS |
| | | | MMC |
| | | | LMC |
| | Perpendicularity | a,d | RFS |

FIG. 8.13

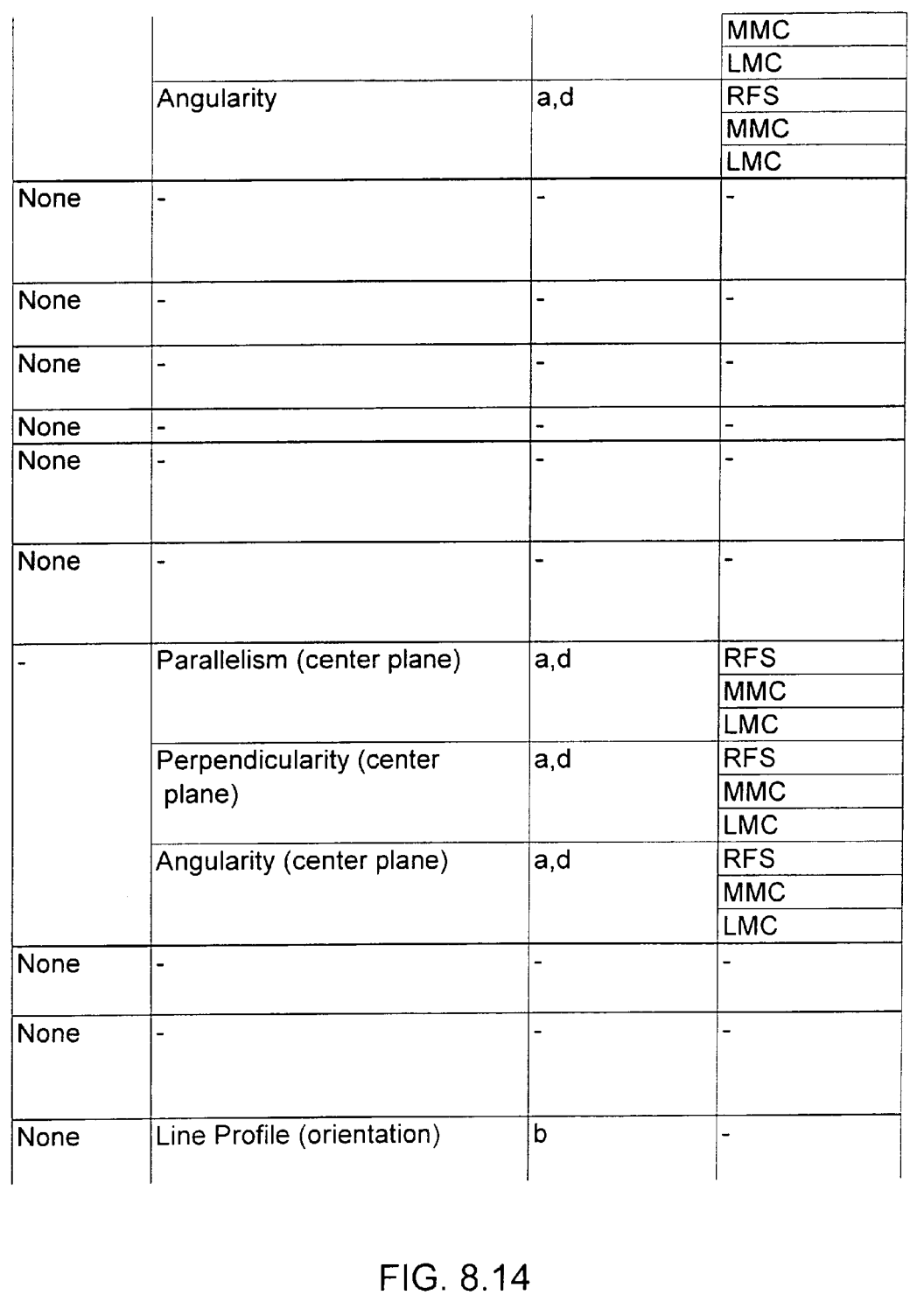

| | | | |
|---|---|---|---|
| | | | MMC |
| | | | LMC |
| | Angularity | a,d | RFS |
| | | | MMC |
| | | | LMC |
| None | - | - | - |
| None | - | - | - |
| None | - | - | - |
| None | - | - | - |
| None | - | - | - |
| None | - | - | - |
| - | Parallelism (center plane) | a,d | RFS |
| | | | MMC |
| | | | LMC |
| | Perpendicularity (center plane) | a,d | RFS |
| | | | MMC |
| | | | LMC |
| | Angularity (center plane) | a,d | RFS |
| | | | MMC |
| | | | LMC |
| None | - | - | - |
| None | - | - | - |
| None | Line Profile (orientation) | b | - |

FIG. 8.14

| | | | |
|---|---|---|---|
| None | Surface Profile (orientation) | b | - |
| None | - | - | - |
| None | - | - | - |
| None | - | - | - |
| | | | - |
| | | | - |
| None | Line Profile (orientation) | b | - |
| None | Surface Profile (orientation) | b | - |
| None | Surface Profile (orientation) | b | - |
| User defined | User defined | User defined | User defined |

FIG. 8.15

| Variation Control | Dim(s) | Type of Control | Placement of Control * |
|---|---|---|---|
| // \| TOL \| A<br>EACH ELEMENT | None | Line Profile | b |
| ⊥ \| TOL \| A<br>EACH ELEMENT | Right angle<br>(no angle specified) | | |
| ↗ \| TOL \| A<br>EACH RADIAL ELEMENT | Right angle<br>(no angle specified) | | |
| ∠ \| TOL \| A<br>EACH ELEMENT | Basic angle(s) | | |
| ⌒ \| TOL \| A | None or<br>basic angle(s) | | |
| // \| TOL \| A | None | Surface Profile | b |
| ⊥ \| TOL \| A<br>⌰ \| TOL \| A | Right angle<br>(no angle specified) | | |
| ∠ \| TOL \| A | Basic angle(s) | | |
| Basic angle; vertex located with datum origin symbol | Basic angle(s), vertex located using datum origin symbol | Linear dimension | |
| ⌓ \| TOL \| A | None or basic angle(s) | | |
| DIM±TOL with datum origin symbol | DIM±TOL with datum origin symbol | | |
| // \| TOL \| A<br>SIM REQT | None | Surface Profile<br>(with basic dims to DRF) | b |

FIG. 8.16

| | | | |
|---|---|---|---|
| ⊥ \| TOL \| A<br>SIM REQT | Right angle<br>(no angle specified) | | |
| ∠ \| TOL \| A<br>SIM REQT | Basic angle(s) | | |
| ⌓ \| TOL \| A | None or basic angle(s) | | |
| - | - | - | - |
| ∠ \| TOL \| A<br>EACH ELEMENT | Basic angle(s) | Line Profile | b |
| ⌒ \| TOL \| A | Basic angle(s) | | |
| - | - | Circular Runout (locates center of tolerance zone | a,b,d |
| ⌓ \| TOL \| A | Basic angle(s) | Surface Profile | b |
| ⌒ \| TOL \| A | Basic radius and basic possibly angle(s) | Line Profile | b |
| - | | - | - |
| ⌓ \| TOL \| A | Basic radius and possibly basic angle(s) | Surface Profile | b |
| | | | |
| - | - | - | - |
| - | - | - | - |
| - | - | - | - |

FIG. 8.17

| | | | |
|---|---|---|---|
| ⫽ TOL A<br>EACH ELEMENT | None | Line Profile | b |
| ⟂ TOL A | Right angle<br>(no angle specified) | | |
| ∠ TOL A<br>EACH ELEMENT | Basic angle(s) | | |
| ⌒ TOL A | None | Circular Runout<br>(locates center of tolerance zone) | a,b,d |
| | | Line Profile | b |
| - | - | - | |
| ⌓ TOL A | Basic angle(s) | Total Runout<br>(locates center of tolerance zone only) | a,b,d |
| | | Surface Profile | b |
| - | - | Concentricity | a,b,d |
| - | - | - | |
| ⫽ TOL A<br>⫽ TOL Ⓜ A<br>⫽ TOL Ⓛ A | None | Position | a,d<br>a,d<br>a,d |
| ⟂ TOL A<br>⟂ TOL Ⓜ A<br>⟂ TOL Ⓛ A | Right angle<br>(no angle specified) | | |
| ∠ TOL A<br>∠ TOL Ⓜ A<br>∠ TOL Ⓛ A | Basic angle(s) | | |
| ⫽ ⌀TOL A<br>⫽ ⌀TOL Ⓜ A<br>⫽ ⌀TOL Ⓛ A | None | Position | a,d |
| ⟂ ⌀TOL A | Right angle | | |

FIG. 8.18

| | | | |
|---|---|---|---|
| ⊥ \| ⌀ TOL Ⓜ \| A<br>⊥ \| ⌀ TOL Ⓛ \| A | (no angle specified) | | |
| ∠ \| ⌀ TOL \| A<br>∠ \| ⌀ TOL Ⓜ \| A<br>∠ \| ⌀ TOL Ⓛ \| A | Basic angle(s) | | |
| - | - | - | - |
| - | - | - | - |
| - | - | - | - |
| - | - | - | - |
| - | - | - | - |
| - | - | Symmetry | a,d |
| // \| TOL \| A<br>// \| TOL Ⓜ \| A<br>// \| TOL Ⓛ \| A | None | Position | a,d |
| ⊥ \| TOL \| A<br>⊥ \| TOL Ⓜ \| A<br>⊥ \| TOL Ⓛ \| A | Right angle<br>(no angle specified) | | |
| ∠ \| TOL \| A<br>∠ \| TOL Ⓜ \| A<br>∠ \| TOL Ⓛ \| A | Basic angle(s) | | |
| - | - | - | - |
| - | - | Circular Runout (locates center of tolerance zone | a,b,d |
| ⌒ \| TOL \| A | Basic angle(s) | Line Profile | b |

FIG. 8.19

| | | | |
|---|---|---|---|
| ⌓ \| TOL \| A | Basic angle(s) | Surface Profile | b |
| - | - | - | - |
| - | - | - | - |
| - | - | - | - |
| | | Concentricity | a.b.d |
| | | Position | a,d |
| ⌒ \| TOL \| A with all around symbol | Basic angle(s) | Line Profile | b |
| ⌓ \| TOL \| A with all around symbol | Basic angle(s) | Surface Profile | b |
| ⌓ \| TOL \| A ALL OVER | Basic angle(s) | Surface Profile | b |
| User defined | User defined | User defined | User defined |

FIG. 8.20

| | | | User Defined |
|---|---|---|---|
| Located | | | |
| Material Condition Modifier | Variation Contorl | Dim(s) | |
| - | ⌒ \| TOL \| A | Basic to DRF | User input |
| - | ⌓ \| TOL \| A | Basic to DRF | User input |
| | DIM±TOL with datum origin symbol | DIM±TOL without datum origin symbol | User input |
| | | | |
| | | | |
| - | ⌓ \| TOL \| A | Basic to DRF | User input |

FIG. 8.21

| | | | |
|---|---|---|---|
| | | | |
| - | - | - | User input |
| - | ⌒ \| TOL \| A | Basic to DRF | User input |
| - | ↗ \| TOL \| A | Zero (not shown) | User input |
| - | ⌓ \| TOL \| A | Basic to DRF | User input |
| - | ⌒ \| TOL \| A | Basic to DRF | User input |
| - | | | User input |
| - | ⌓ \| TOL \| A | Basic to DRF | User input |
| - | - | - | User input |
| - | - | - | User input |
| - | - | - | User input |

FIG. 8.22

| | | | |
|---|---|---|---|
| - | ⌒ TOL A EACH ELEMENT | Basic to DRF | User input |
| - | ↗ TOL A | Zero (not shown) | User input |
| - | ⌒ TOL A | Basic to DRF | |
| - | | | User input |
| - | ⌰ TOL A | Zero (not shown) | User input |
| - | ⌓ TOL A | Basic to DRF | |
| - | ◎ ⌀TOL A | Zero (not shown) | User input |
| - | | | User input |
| RFS | ⌖ TOL A | Basic to DRF | User input |
| MMC | ⌖ TOL Ⓜ A | | |
| LMC | ⌖ TOL Ⓛ A | | |
| RFS | ⌖ ⌀TOL A | Basic to DRF | User input |
| MMC | ⌖ ⌀TOL Ⓜ A | | |
| LMC | ⌖ ⌀TOL Ⓛ A | | |

FIG. 8.23

| | | | |
|---|---|---|---|
| | | | |
| - | - | - | User input |
| - | - | - | User input |
| - | - | - | User input |
| - | - | - | User input |
| - | - | - | User input |
| - | ⌯ \| TOL \| A | Zero (not shown) | User input |
| RFS | ⌖ \| TOL \| A | Basic to DRF | User input |
| MMC | ⌖ \| TOL Ⓜ \| A | | |
| LMC | ⌖ \| TOL Ⓛ \| A | | |
| - | - | - | User input |
| - | ↗ \| TOL \| A | Zero (not shown) | User input |
| - | ⌒ \| TOL \| A | Basic to DRF | User input |

FIG. 8.24

| | | | |
|---|---|---|---|
| - | ⌓ \| TOL \| A | Basic to DRF | User input |
| - | - | - | User input |
| - | - | - | User input |
| - | - | - | User input |
| - | ◎ \| SØ TOL \| A | Zero (not shown) | User input |
| RFS | ⌖ \| SØ TOL \| A | Basic to DRF | User input |
| MMC | ⌖ \| SØ TOL Ⓜ \| A | | |
| LMC | ⌖ \| SØ TOL Ⓛ \| A | | |
| - | ⌒ \| TOL \| A with all around symbol | Basic to DRF | User input |
| - | ⌓ \| TOL \| A with all around symbol | Basic to DRF | User input |
| - | ⌓ \| TOL \| A ALL OVER | Basic to DRF | User input |
| User defined | User defined | User defined | - |

FIG. 8.25

MECHANICAL TOLERANCE METHOD

This utility application claims benefit of Provisional Patent Application Ser. No. 60/398435 filed Jul. 25, 2002 and which is hereby incorporated by reference.

BACKGROUND OF THE INVENTION

1. Technical Field of the Invention

This invention relates to tolerance analysis, and more particularly, to a method of optimizing mechanical tolerances for designing and manufacturing components.

2. Description of Related Art

During initial production of products, many companies have quite a few quality and documentation problems. Many of the initial production problems fall into one of three categories: manufacturing, assembly fit, and design documentation. Manufacturing problems are particularly evident in the form of high scrap rates. To reduce these scrap rates, manufacturers often have to rework parts, add fixtures to current manufacturing processes, utilize different (and usually more expensive) processes, inspect more parts, and, of course, increase quality control testing of the products. Obviously, these measures can be quite expensive.

In regards to assembly fit problems, manufacturers oftentimes work around these problems by mixing and matching parts, modifying parts within the assembly area, sending the parts to another department or vendor for modification, or merely discarding the defective parts. However, the only permanent solution to assembly fit problems is to change the design and/or its manufacturing processes. Typically, scrapping an entire design and starting from scratch is cost prohibitive, and thus not normally done. Instead, design changes are made that minimize the impact on the costs. Normally, modification of designs are minimized, which usually means that the optimal solution is not used. Design fixes may include designing additional parts, adding adjustments to the design, adding or changing assembly processes, maintaining unique parts and tightening tolerances. However, these actions drastically increase recurring manufacturing costs and require the focus of design teams to be on ongoing production rather than developing new products.

Correcting these assembly and manufacturing deficiencies requires many documentation changes, which typically includes writing engineering changes to product drawings (e.g., changing dimensioning schemes, nominal dimensions, tolerances, variation controls, purchased parts, etc.), tooling drawings, and manufacturing process documents. Additionally, many changes are required to correct inappropriately applied variation controls that violate a dimensioning standard or do not control a feature as intended.

The cost for implementing fixes to these problems is both staggering and not completely effective. In addition, companies risk exposure to warranty and legal costs from mass-producing defective products. A methodology is needed that links mechanical assembly tolerancing requirements to part variation controls in order to improve the mechanical tolerancing process.

Thus, it would be a distinct advantage to have a system and method which provides a link between mechanical assembly tolerancing requirements and part variation controls. It is an object of the present invention to provide such a system and method.

SUMMARY OF THE INVENTION

In one aspect, the present invention is a method of optimizing tolerances for a design and assembly of a plurality of components. The method begins by defining an assembly requirement. Next, datum features are defined and component dimensions are assigned. A dimensional loop diagram is then created for each component. An appropriate analysis/allocation method for determining tolerances of the plurality of components is then selected. Variation controls to features of the plurality of components are applied and tolerances to features of the plurality of components are assigned.

In another aspect, the present invention is a method of applying variation controls for a feature of a component in an assembly of a plurality of components through a decision matrix. A user may input a feature type, a controlled element of the feature, a tolerance zone shape and a relationship of a tolerance zone to a datum reference frame into a matrix. By following the decision matrix, a variation control is selected and applied.

In still another aspect, the present invention is a system for automatically applying variation controls of a feature of a component in an assembly of a plurality of components. The system includes a computer for calculating and determining variation controls of the feature, a user interface for a user to input data relevant for determining variation controls of the feature and a memory for storing information applicable for applying variation controls. The user inputs all relevant data of the feature through the user interface to the computer. The computer then calculates an appropriate variation control associated with the feature and applying the calculated variation control in an appropriate location determined by the computer.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 8 is formed using FIGS. 8.1–8.25, and FIGS. 8.1–8.25 are matrices for determining variation controls in the preferred embodiment of the present invention.

DETAILED DESCRIPTION OF EMBODIMENTS

Figure 1:
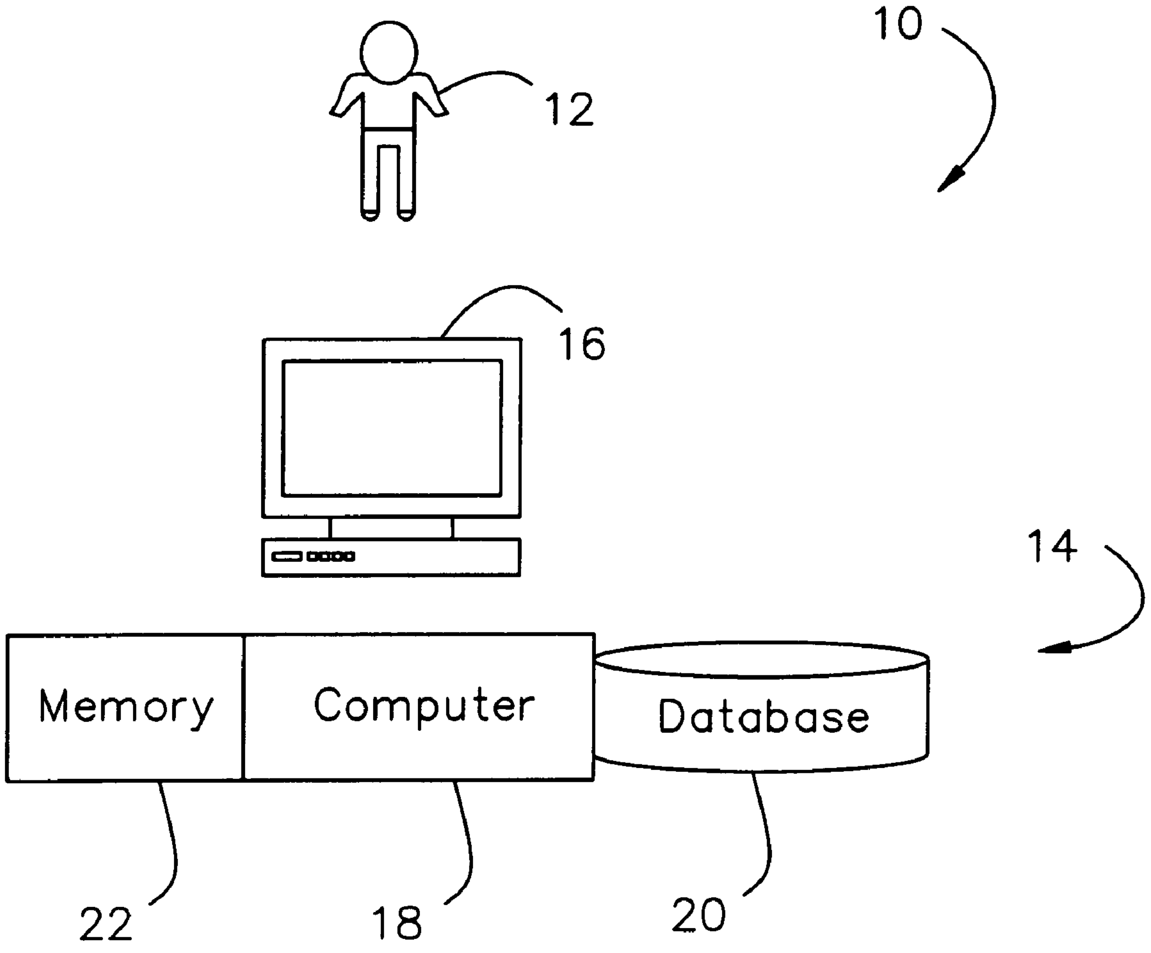
FIG. 1 is a simplified block diagram of the components of a design system in the preferred embodiment of the present invention.

FIG. 1 is a simplified block diagram of the components of a design system 10 in the preferred embodiment of the present invention. The system includes a design engineer 12 providing inputs into a computing system 14. The computing system may include a standard computer terminal 16, a computer 18, a database 20 and a memory 22.

Figure 2:
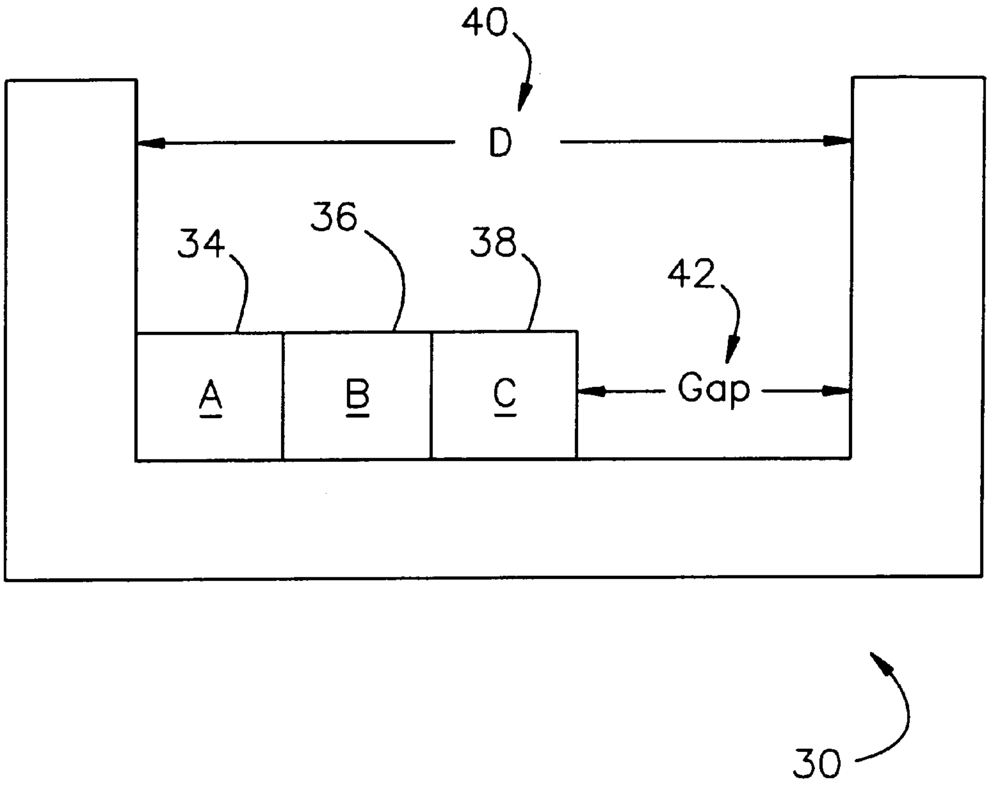
FIG. 2 is a side view of a plurality of components of a product.
Figure 3A:
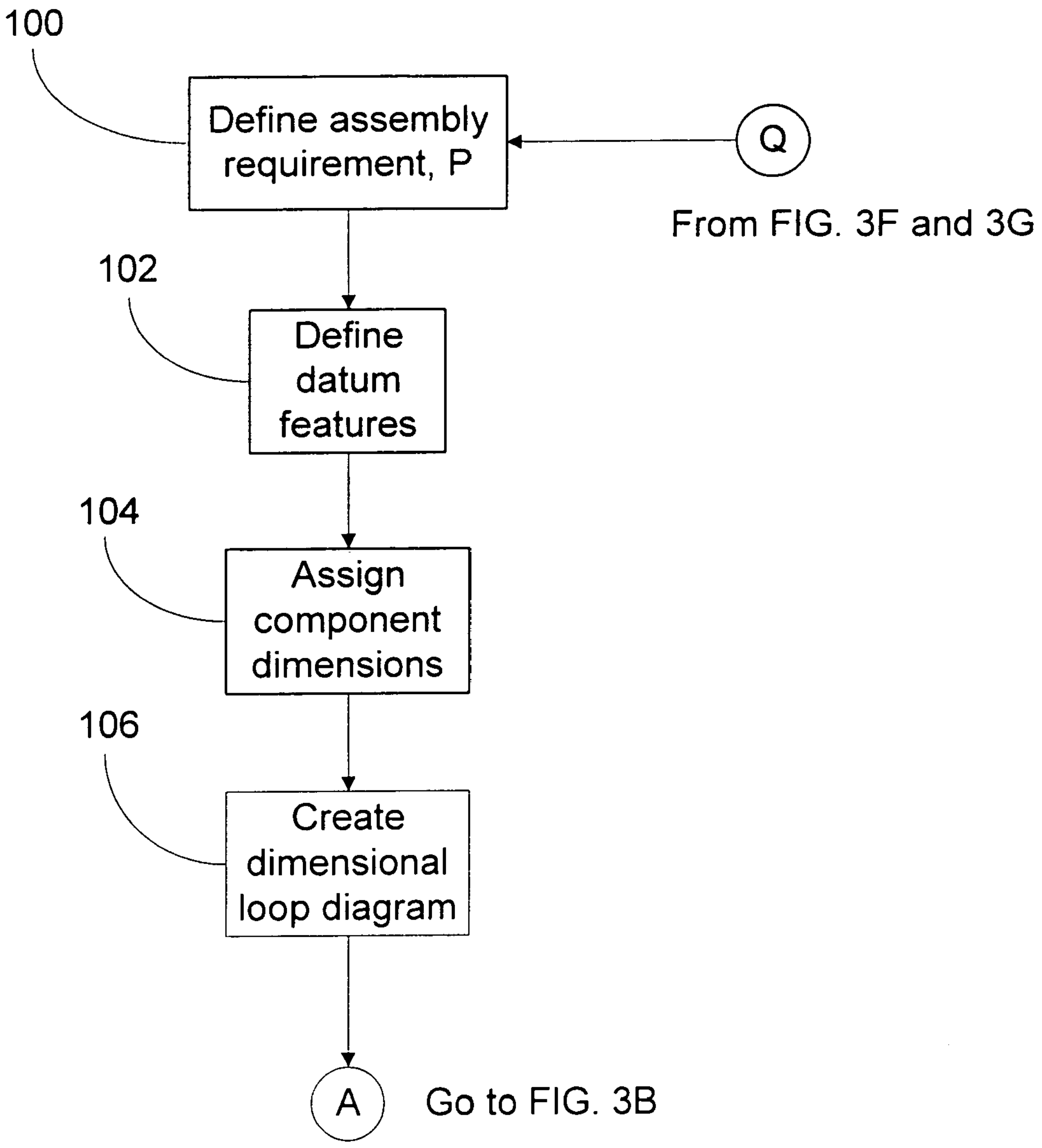
FIGS. 3A–G are flow charts outlining the steps for determining mechanical tolerances on a plurality of components design according to the teachings of the present invention.
Figure 3B:
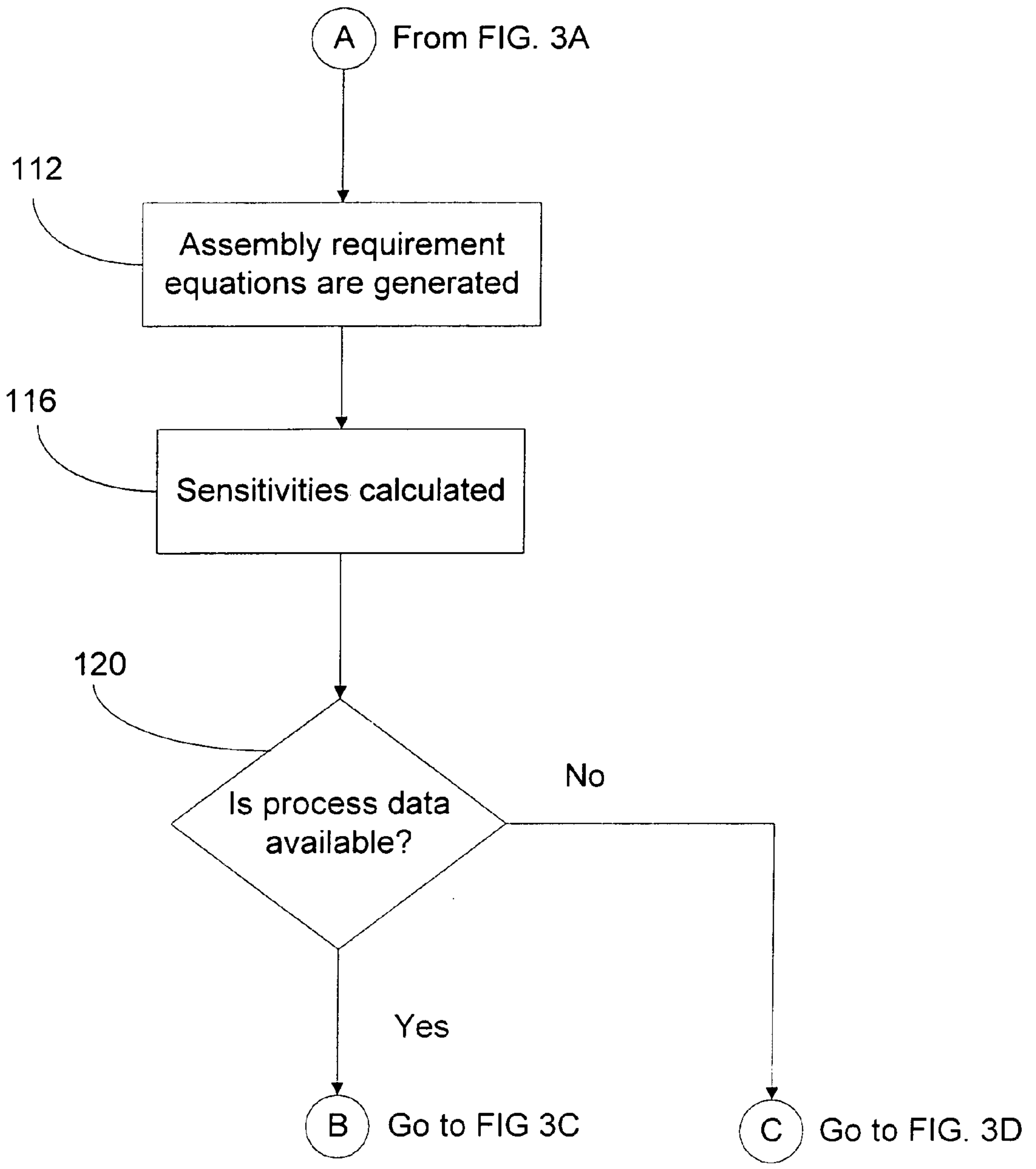
Figure 3C:
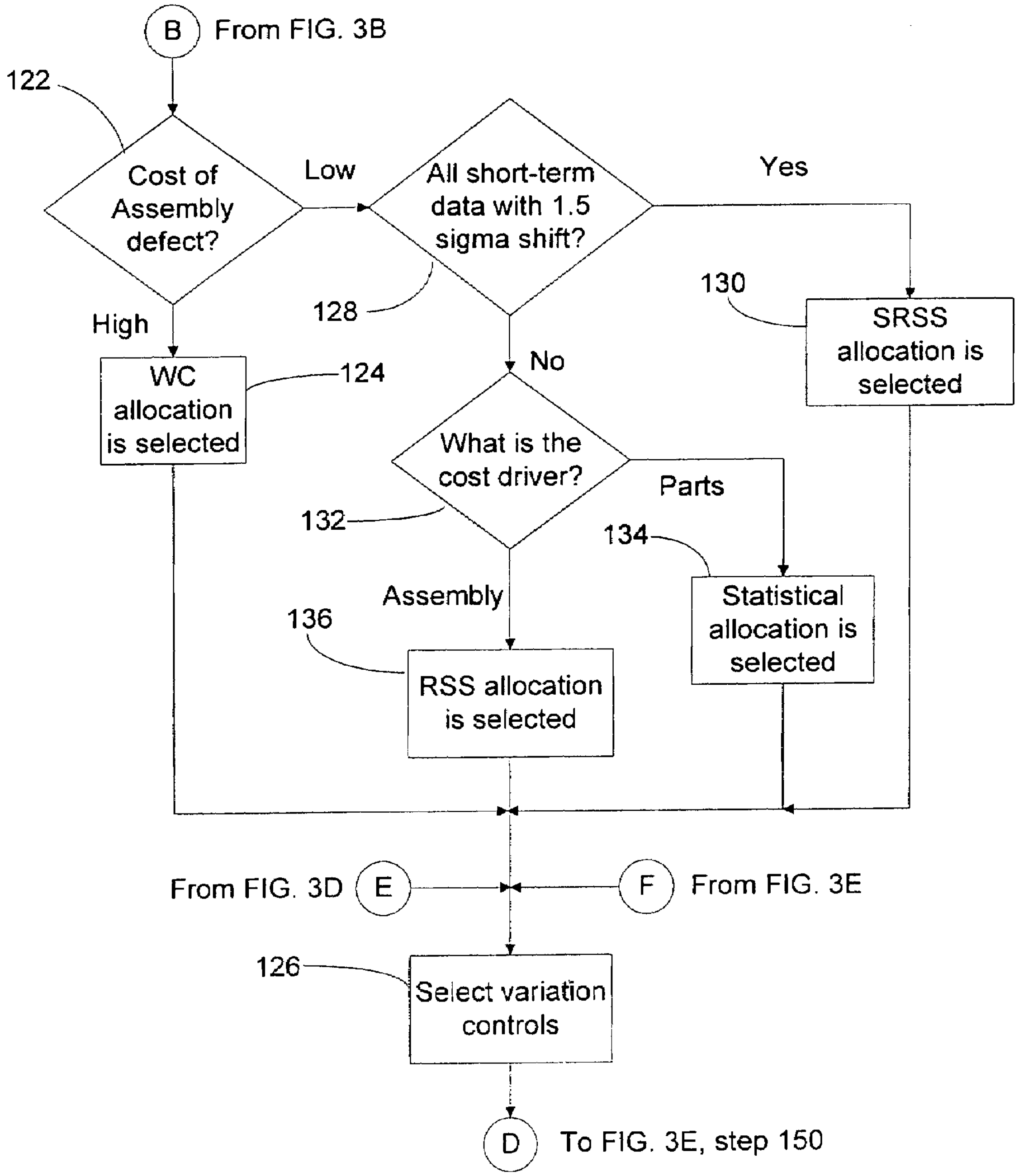
Figure 3D:
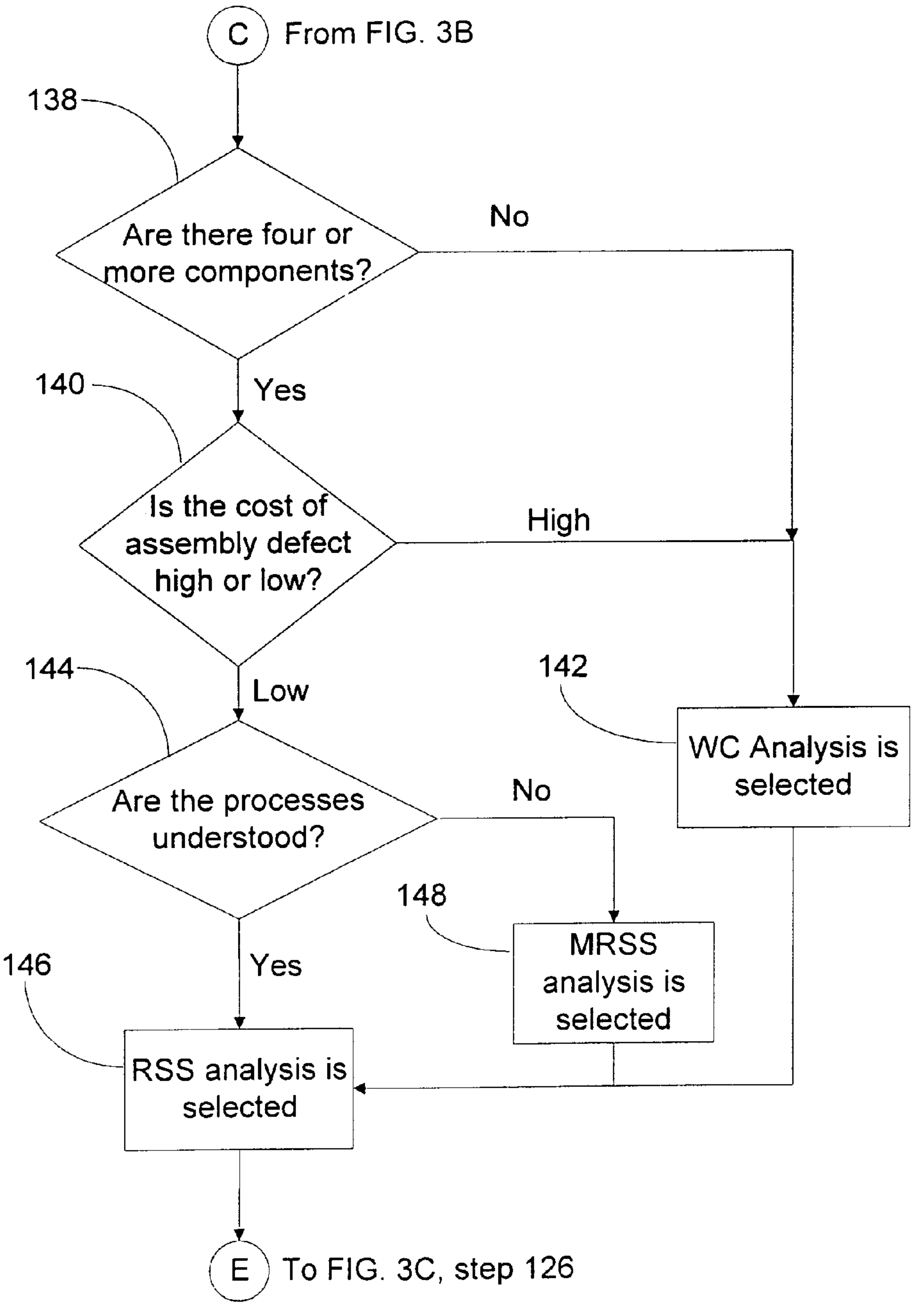
Figure 3E:
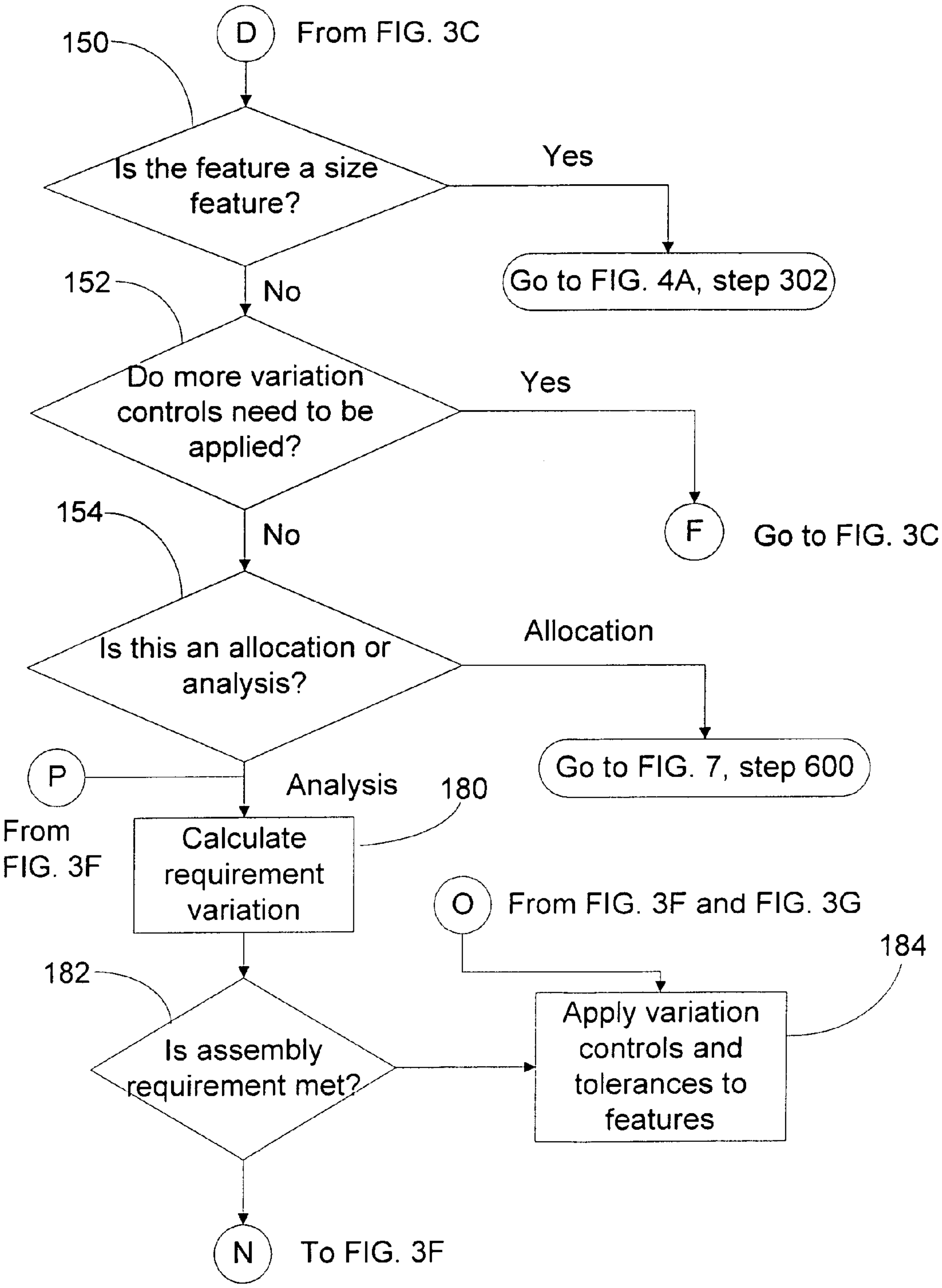
Figure 3F:
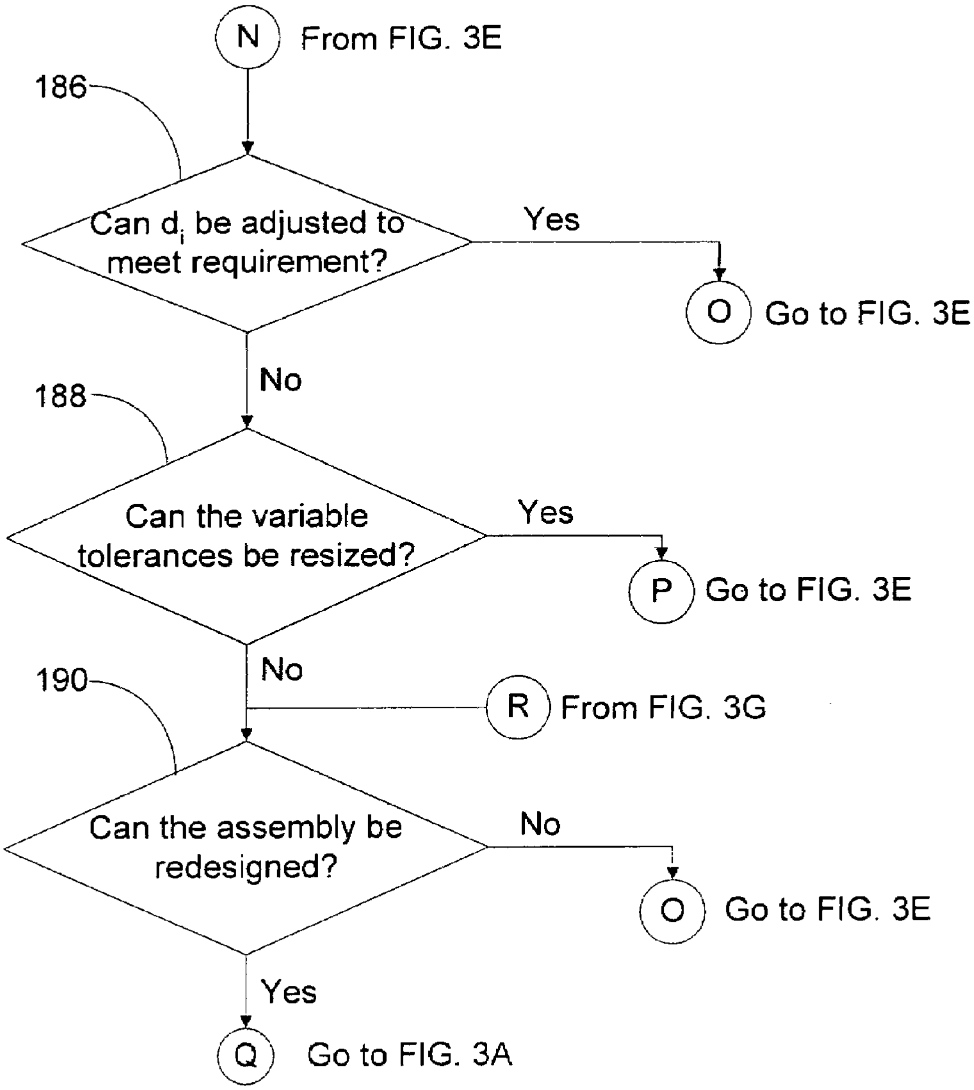
Figure 3G:
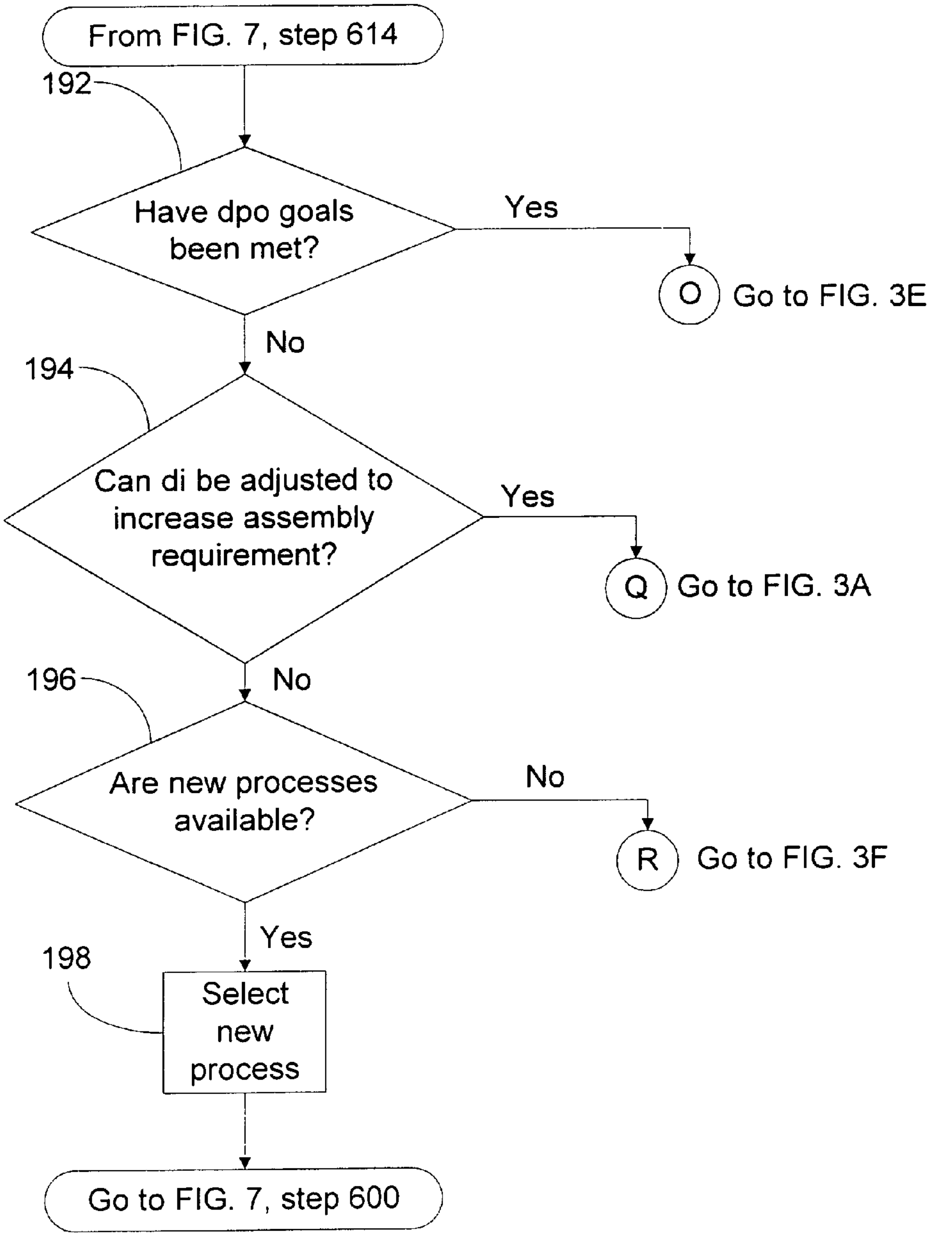

FIG. 2 is a side view of a plurality of components of a product 30. In a very simplified view for illustrative purposes only, a product may have blocks 34, 36, 38 fitting within an opening 40. The block 34 may have a width A, the block 36 having a width B, the block 38 having a width C, and the opening 40 having a width D. A gap 42 is the assembly requirement.

FIGS. 3A–G are flow charts outlining the steps for determining mechanical tolerances on a plurality of components design according to the teachings of the present invention. The method begins with step 100 where an assembly requirement is defined by the design engineer 12. The assembly requirement may include one of a plurality of assembly requirements necessary to manufacture a product without any defects. For example, referring to FIG. 2, the assembly requirement may be that the width of the gap must be greater than a specified distance. Typically, the assembly requirement is within a specified range.

Next, in step 102, datum features are defined for the components. An origin on the components is established for measuring dimensions of the components. The method then moves to step 104, where dimensions of the components are defined. The dimensions are the nominal or ideal dimensions of the components necessary to build an ideal product.

The dimensional loop diagram establishes the relationship between the components and the assembly requirements. To create a dimensional loop diagram, in step 108, it is determined whether the components are one dimensional (i.e., all components in the same axis). If it is determined that the components are a one-dimensional loop diagram, the method moves to step 110 where loop diagrams in the horizontal and/or vertical axes are determined.

Still referring to step 110, for the horizontal loop diagram, the loop diagram is originated at the feature, on the left-hand side of the assembly requirement (e.g., gap). Using vectors, a closed loop is created from the left side of the start point to the right side. Next, a name is assigned to each vector. Each vector is identified with a positive or negative sign (i.e., positive vectors pointing to the right and negative vectors pointing to the left). A component name and nominal value is assigned to each dimension in the loop.

Again, still referring to step 110, for the vertical loop diagram, the loop diagram is begun at the feature on the bottom of the assembly gap (e.g., gap). Using vectors, a closed loop is created from the bottom of the gap to the top. Each vector is assigned a name and identified as positive or negative (i.e., positive vectors pointing up and negative vectors pointing down). A component name and nominal value to each dimension in the loop is assigned. Once the horizontal or vertical axes analysis has been conducted, assembly requirement equations are generated in step 112.

If it is determined in step 108 that the loop diagram is multi-dimensional, the method moves to step 114. To determine the gap equation in multi-dimensions, first a gap coordinate system is established with an origin at one side of the assembly requirement (e.g., gap). Next, a vector loop diagram is drawn starting at the origin point of the assembly requirement coordinate system. A name is assigned to each vector in the loop. A coordinate system is established for each vector. In addition, a component name and nominal values for each vector in the loop is assigned. Vectors in terms of a vector coordinate system are defined. Relationships between vector coordinate systems and assembly requirement coordinate system are defined. All the vectors are then converted into an assembly requirement coordinate system. Next, in step 112, a gap equation is generated.

At step 112, the loop diagrams provide nominal values without any tolerance range. Next, the method moves from step 112 to step 116, where sensitivities are calculated. Sensitivities are an indication of how much each vector influences the assembly requirement.

Next, the method moves to step 120 where an analysis/allocation method is selected. In existing tolerance analysis, a design engineer merely picks an analysis or allocation method. The present invention provides a framework for picking the best method depending on the information available. In step 120, it is determined if data on the manufacturing process for each component is available. If it is determined that process data is available, the method moves to step 122 where it is determined if the cost of assembly defects is high as compared to parts defects. If the cost of assembly defects is high, the method moves from step 122 to step 124 where a worst case (WC) allocation method is utilized. Next, in step 126, variation controls are applied.

However, in step 122 if it is determined that the cost of assembly defects is low compared to parts defects, the method moves to step 128 where it is determined if all data is short term and a 1.5 sigma (standard deviation) shift is appropriate to convert the short term data into a long term projection. If it is determined that a 1.5 sigma shift is appropriate, the method moves to step 130 where a static root sum of the squares (SRSS) allocation methodology is selected. The method then moves to step 126 where variation controls are applied.

However, in step 128, if it is determined that short term data is not available or a 1.5 sigma shift is not appropriate, the method moves to step 132 where it is determined whether the cost driver is parts or assembly costs. If it is determined that parts is the cost driver, the method moves to step 134 where statistical allocation is chosen. Next, the method moves to step 126 where variation controls are applied.

In step 132, if it is determined that assembly costs are the cost driver, the method moves to step 136 where root sum of the squares (RSS) allocation is selected. Next, the method moves to step 126 where variation controls are applied.

However, in step 120, if it is determined that process data is not available, the method moves from step 120 to step 138 where it is determined if there are four or more components being analyzed. If it is determined that four or more components are to be analyzed, the method moves to step 140 where it is determined if the cost of assembly defects is high or low. If it is determined that cost of assembly defects is high, a WC analysis is selected in step 142. Next, in step 126, variation controls are applied.

However, if it is determined that cost of assembly defects is low, the method moves from step 140 to step 144 where it is determined if the processes are understood. If the design engineer has a good understanding of the process, the method moves to step 146, where RSS analysis is implemented. Typically, processes are considered well understood if they are produced by a vendor or shop that has successfully met the component requirements in the past. Next, in step 126, the variation controls are applied.

If it is determined that the manufacturing processes are not well understood, the method moves from step 144 to step 148 where modified root sum of the squares (MRSS) is selected. The method then moves to step 126 where variation controls are applied.

However, in step 138, it is determined if there are not four or more components being analyzed. If it is determined that there are less than four components, the method then moves to step 142 where WC analysis is implemented. Next, in step 126, the variation controls are applied.

In the preferred embodiment of the present invention, the variation controls are applied through reference to the database which provides a plurality of queries to automatically obtain the appropriate variation controls. The design engineer may input the appropriate answers to the questions to automatically obtain the appropriate variation controls. In addition, this is done without iteration that frequently occurs with existing methods. Specifically, existing methods require the manual selection and application of variation controls and a check by another individual or, in a limited sense, a syntax check of the variation controls by a software program. In an alternate embodiment of the present invention, the application of variation controls may be done manually by answering the plurality of queries.

FIGS. 8.1–8.25 are matrices for determining variation controls in the preferred embodiment of the present invention. First, a feature type is selected. As defined on the chart, the feature types may include, but are not limited to the following: axis, center plane, conical, cylindrical, planar, point, radial, revolute, spherical, surfaces, width, and user defined. Next, a controlled element of the feature is selected, such as independent line elements of surface, single surface, etc. as depicted in the second column of the chart. Next, tolerance zone shape is selected, such as two parallel lines, two parallel planes, etc. (see chart). The relation of the tolerance zone to the datum frame reference (DRF), such as none, oriented, etc., is determined. After selecting the appropriate variables, the computer selects the appropriate variation control and applies it accordingly. The illustrated columns may be stored in the database. Through queries provided by the computer, the computing system may automatically provide the application of the appropriate variation controls.

Once the variation control is applied, the method moves from step 126 to step 150 where it is determined if the controlled/datum feature should be treated as a size feature. If it is determined that the controlled/datum feature is not a size feature, the method moves from step 150 to step 152 where it is determined if variation controls need to be applied to any more features in the stack-up for the selected component. If it is determined that more variation controls need to be applied to more features, the method moves from step 152 to step 126 where the process of applying the variation control is implemented. However, if in step 152 it is determined that no more features require an application of variation controls, the method moves to step 154 where it is determined if the methodology is an allocation or an analysis.

Figure 4A:
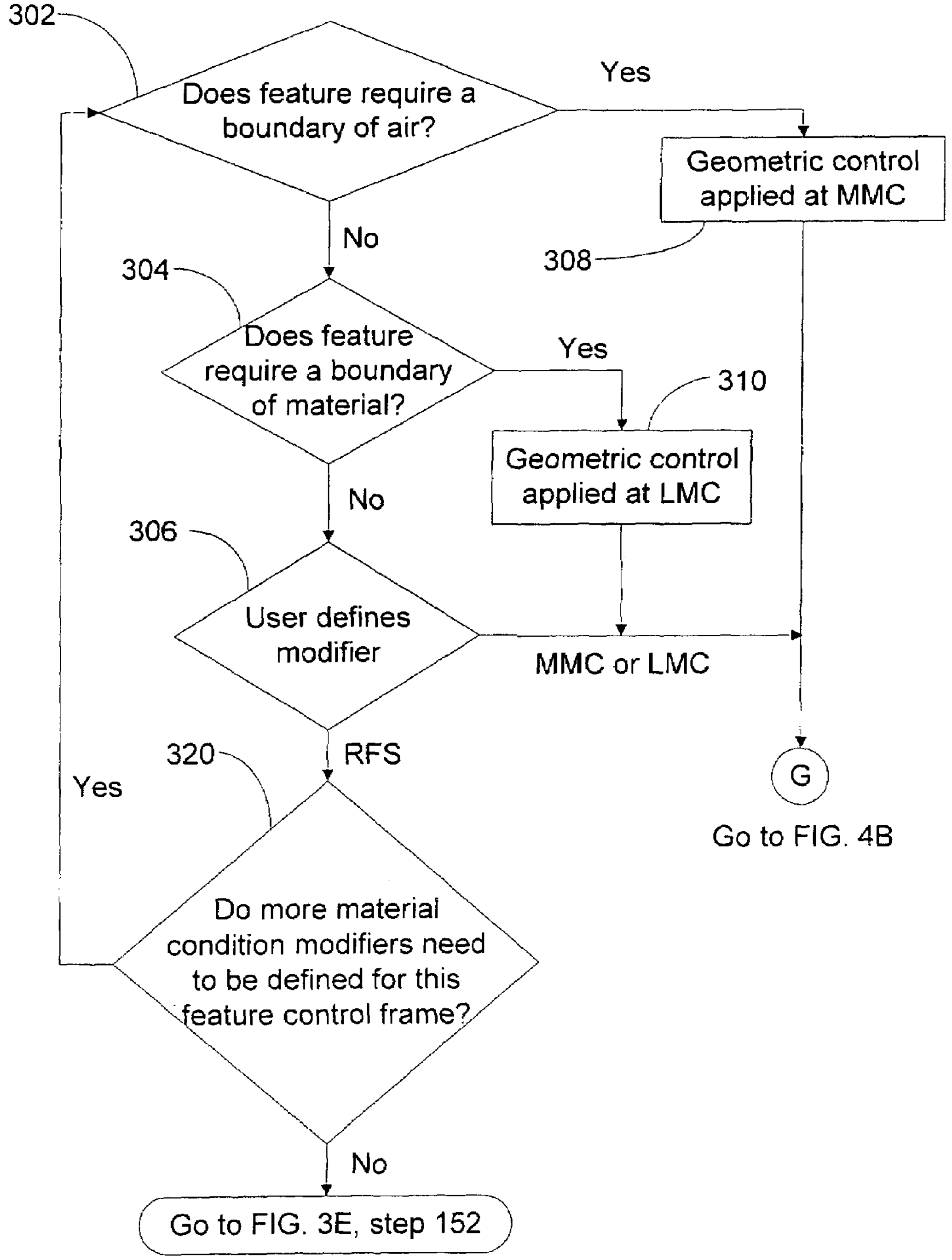
FIGS. 4A–B are flow charts illustrating the steps of defining feature material condition modifiers utilized in determining variation controls according to the teachings of the present invention.
Figure 4B:
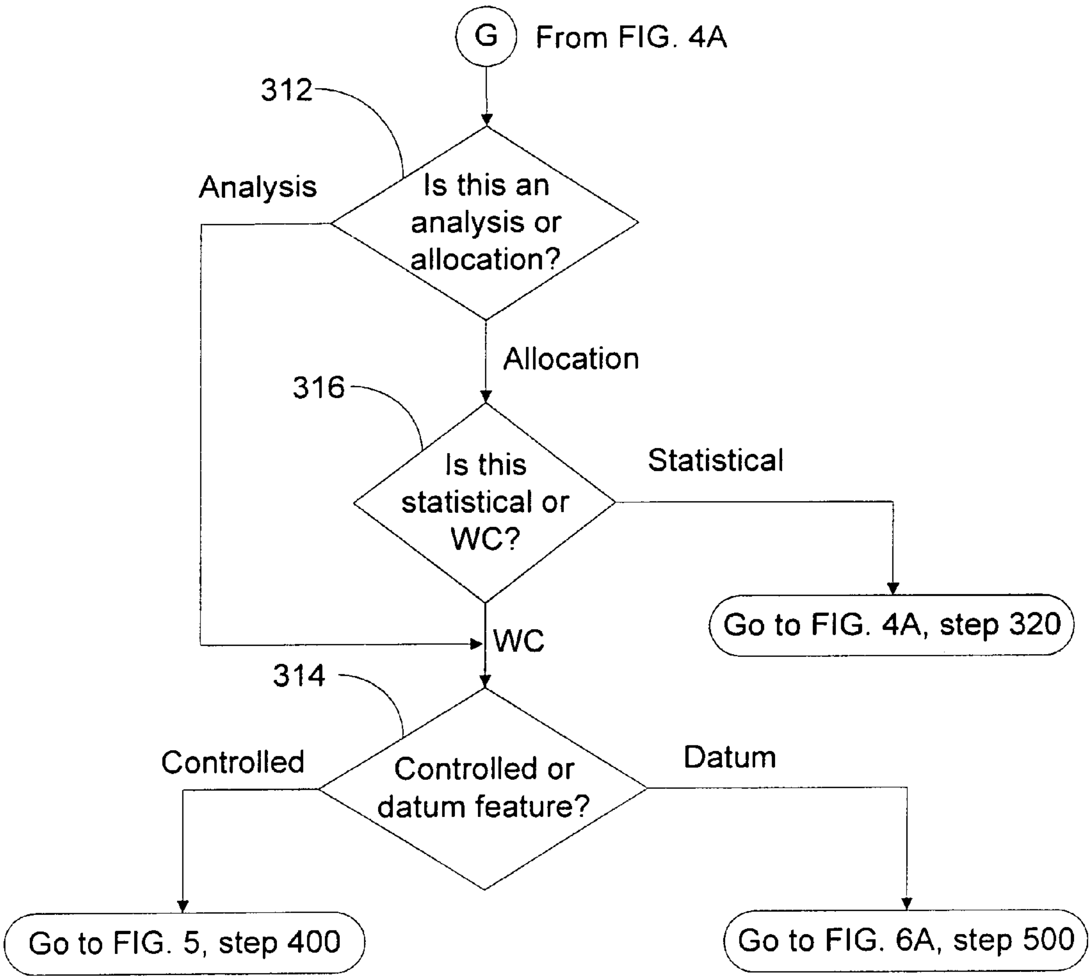

However, if it is determined that the controlled/datum feature should be treated as a size feature in step 150, the method moves to step 302 in FIG. 4 where feature material condition modifiers are defined. FIGS. 4A–B are flow charts illustrating the steps of defining feature material condition modifiers utilized in determining variation controls in step 126 of FIG. 3. To define the feature material condition modifiers, the method begins with step 302 where it is determined if the feature requires a "boundary of air" (e.g., a clearance fit). If it is determined that there is no boundary of air required, the method moves to step 304 where it is determined if the feature requires a "boundary of material" (e.g., to protect a minimum wall thickness). In step 304, if it is determined that the feature does not require a boundary of material, the method moves to step 306 where the user defines a modifier, typically maximum material condition (MMC)/least material condition (LMC) or regardless of feature size (RFS). If MMC/LMC is selected, in step 306, the method moves to step 312. However, in step 306, if RFS is chosen, the method moves to step 320.

However, in step 302, if it is determined that the feature requires a boundary of air, the method moves to step 308 where a geometric control is applied at MMC. Next, the method moves to step 312.

Likewise, in step 304, if it is determined that the feature requires a boundary of material, the method moves to step 310 where a geometric control is applied at LMC. The method then moves to step 312.

At step 312, it is determined if the methodology is an analysis or an allocation. The determination if the methodology is an analysis or allocation may be referred back to step 120 where either an analysis or allocation method was selected. If process data is available, the user selects an allocation. If process data is not available, the methodology is an analysis. If, in step 312, it is determined that the methodology is an analysis, the method moves to step 314 where it is determined if it is a controlled feature or a datum feature. If it is determined that it is a controlled feature, the method moves to step 400 in FIG. 5 where LMC and MMC variation for the controlled features are calculated. However, in step 314, if it is determined that it is a datum feature, the method moves from step 314 to step 500 in FIG. 6 where LMC and MMC variation of the datum features are calculated.

However, in step 312, if it is determined that the methodology is an allocation, the method moves to step 316 where it is determined if it is a statistical or worst case allocation. Again, this has been determined in step 120. Statistical, RSS, and SRSS are all statistical allocations. WC is a worst case allocation. If it is determined that the methodology is a statistical allocation, the method moves back to step 320 (FIG. 4) to determine if any more material condition modifiers need to be defined.

However, if it is determined in step 316 that the allocation is a worst case allocation, the method moves to step 314 where it is again determined if it is a controlled feature or a datum feature.

Figure 5:
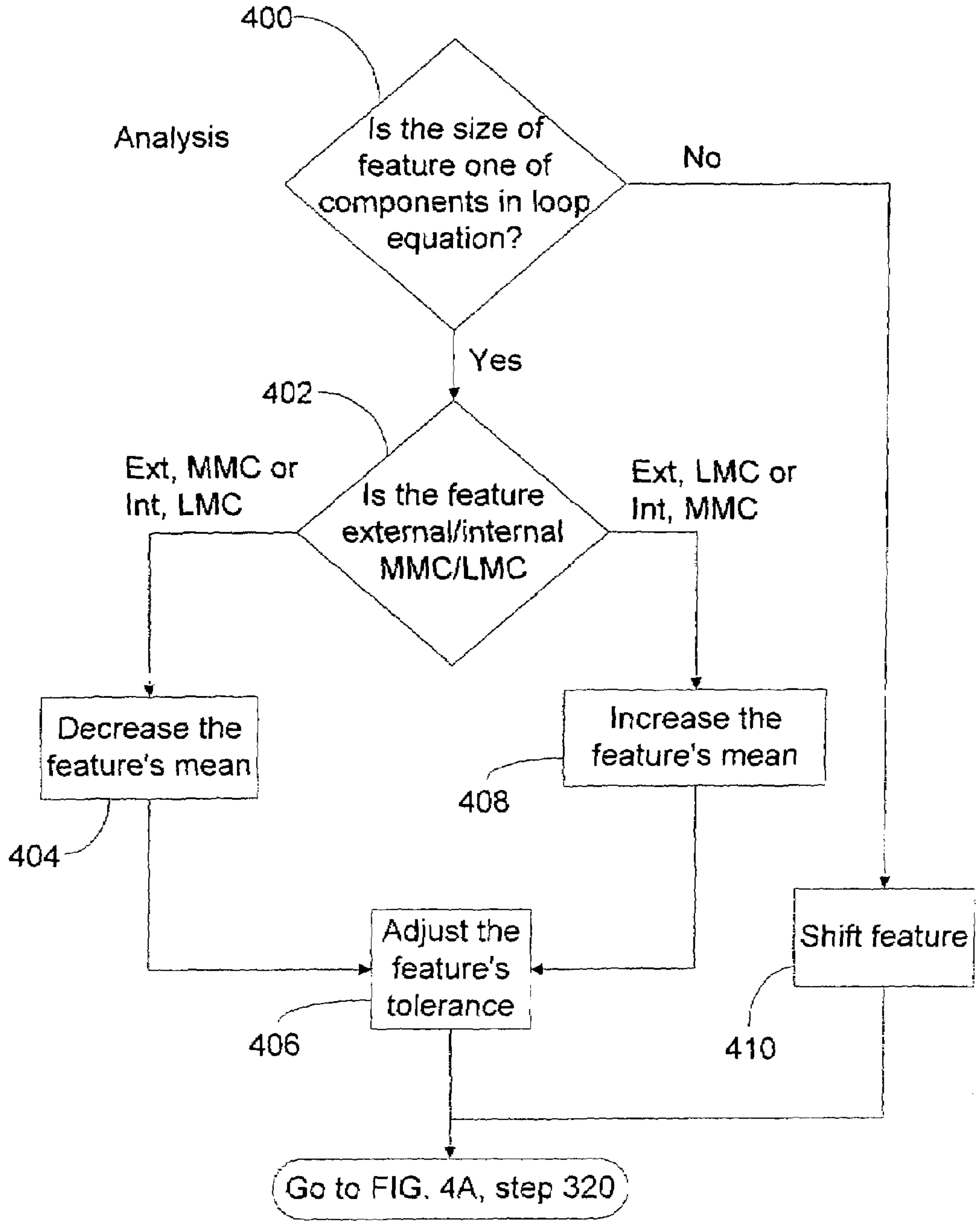
FIG. 5 is a flow chart illustrating the steps of calculating LMC/MMC variation for controlled features.

FIG. 5 is a flow chart illustrating the steps of calculating LMC/MMC variation for controlled features. Beginning with step 400 where it is determined if the size of the controlled feature is one of the components of the loop equation determined earlier. If, in step 400, it is determined that size of the controlled feature is one of the components of the loop equation, the method moves to step 402 where it is determined if the feature is external or internal and whether the feature is at MMC or LMC. If it is determined that the feature is external and at MMC or internal and at LMC, the method moves to step 404 where the feature's mean is decreased by: $[(PlusTol_i+MinusTol_i)/2)$. The method then moves to step 406 where the feature's tolerance is adjusted by: $[(PlusTol_i+MinusTol_i)/2)$. $PlusTol_i$ and $MinusTol_i$ are the tolerances of the feature associated with the material condition modifier. Next, in step 320 (FIG. 4), it is determined if more material condition modifiers need to be defined for this feature control frame (FCF). From step

320, if it is determined that more material condition modifiers need to be defined, the method moves back to step 302.

However, in step 320, if it is determined that no more material condition modifiers require defining, the method moves back to step 152 (FIG. 3) where it is determined if more variation controls need to be applied to more features in the stack-up.

Referring back to step 402 of FIG. 5, if it is determined that the feature is external and at LMC or internal and at MMC, the method moves from step 402 to step 408 where the feature's mean is increased by: $[(\text{PlusTol}_i+\text{MinusTol}_i)/2)$. $\text{PlusTol}_i$ and $\text{MinusTol}_i$ are the tolerances of the feature associated with the material condition modifier. The method then moves to step 406 where the feature's tolerance is adjusted. This is the size feature associated with the material condition modifier.

If, in step 400, it is determined that the size of the controlled feature is not a component in the loop equation, the method moves to step 410 where the feature is shifted by:

$$|a_i|[0+/-(\text{PlusTol}_i+\text{MinusTol}_i)/2]$$

$\text{PlusTol}_i$ and $\text{MinusTol}_i$ are the tolerances of the size features associated with the material condition modifier. $a_i$ is the sensitivity of the axis/center plane/center point of the controlled feature. Next, moving from step 410 to step 320, it is determined if more material condition modifiers for this FCF require defining.

Figure 6A:
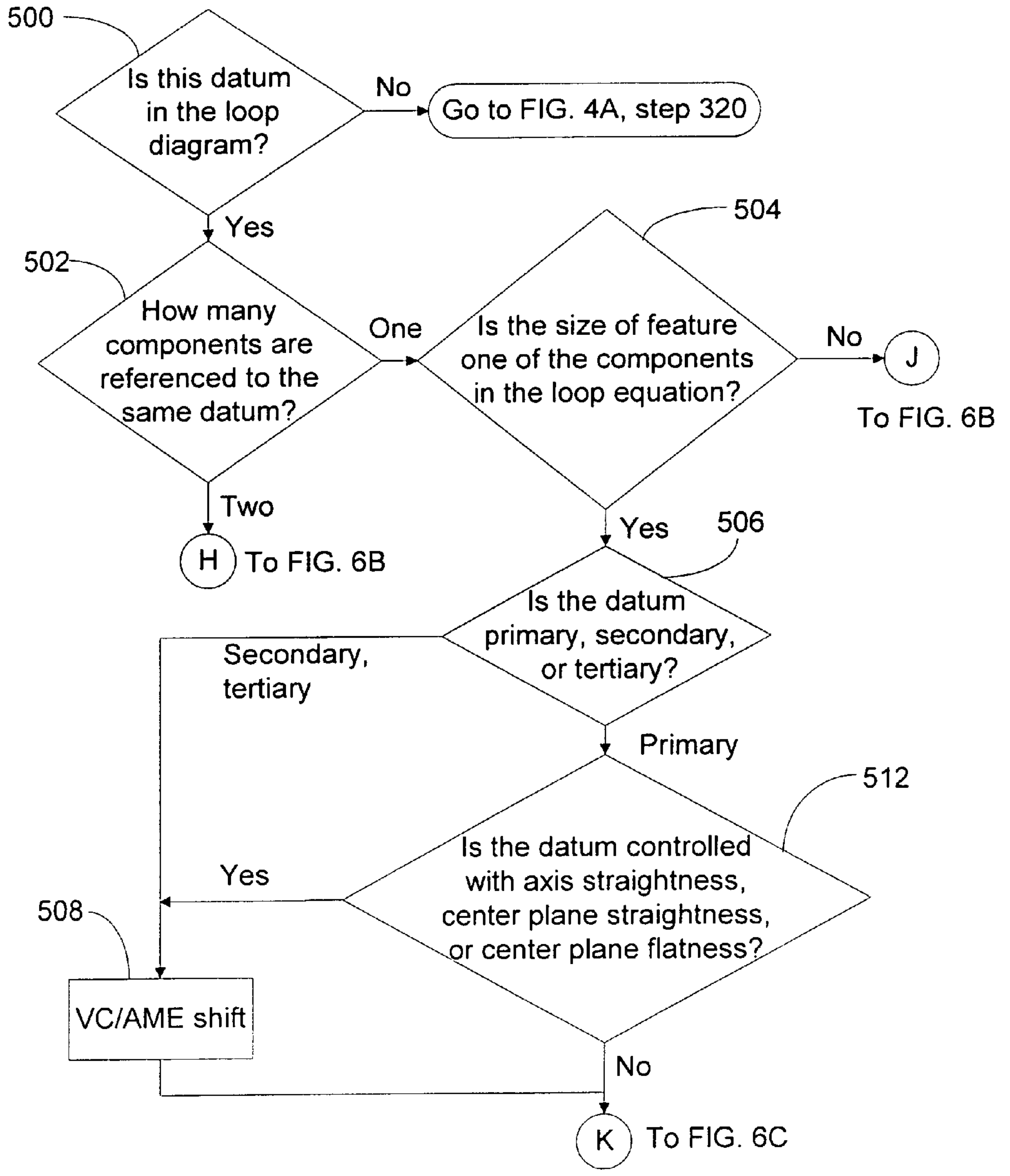
FIGS. 6A–C are flow charts illustrating the steps for calculating LMC/MMC variation of datum features.
Figure 6B:
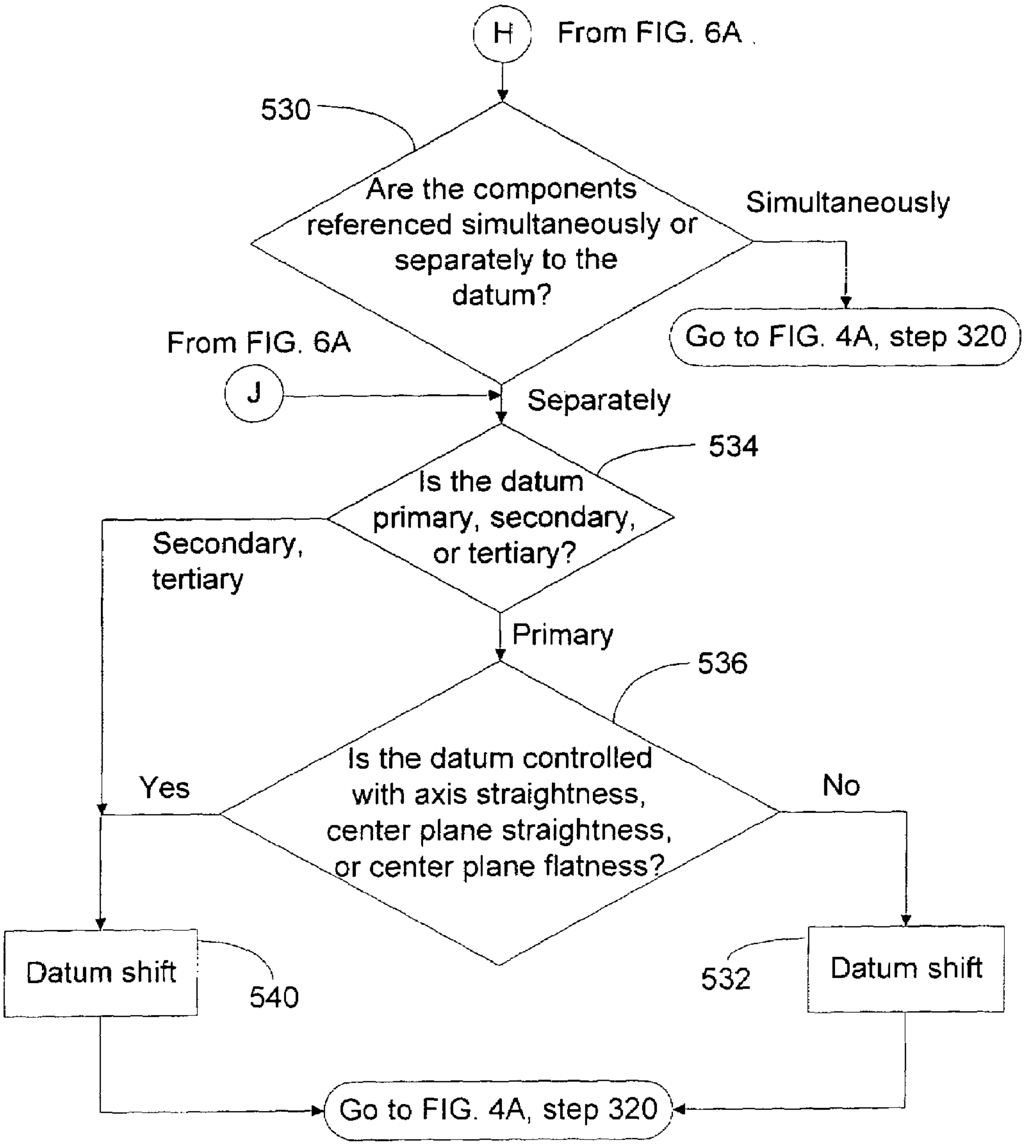
Figure 6C:
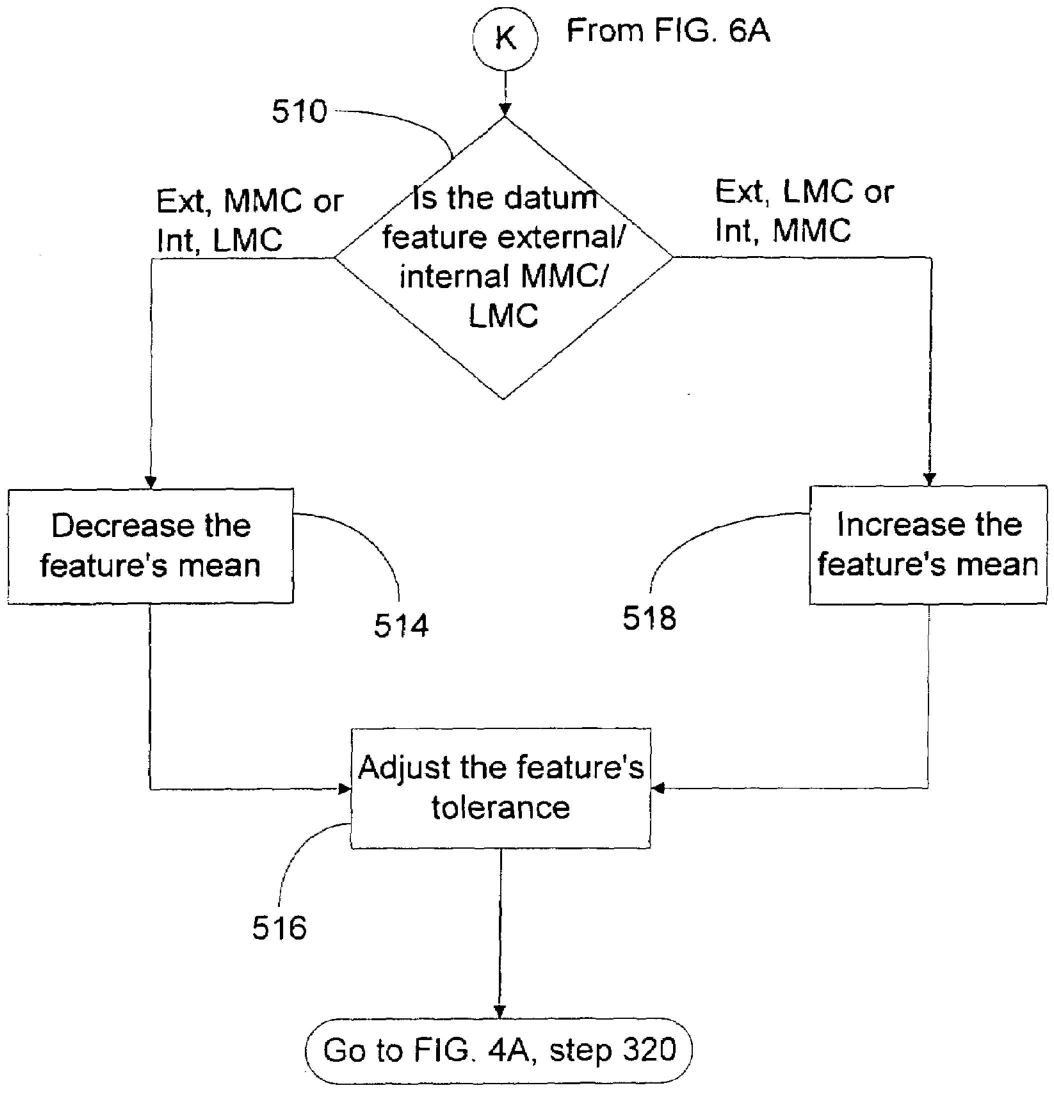

FIGS. 6A–C are flow charts illustrating the steps for calculating LMC/MMC variation of datum features. Referring back to FIG. 4, in step 314, if it is determined that the feature is a datum feature, the method moves to step 500 where it is determined if the datum is in the loop diagram created earlier in the methodology. If the datum is not in the loop diagram, the method moves to step 320 where it is determined if additional material condition modifiers must be defined for this FCF.

However, in step 500, if it is determined that the datum is in the loop diagram, the method moves to step 502 where it is determined how many components are referenced to the datum (same order of precedence and same material condition modifiers). If it is determined that only one component is referenced, the method moves from step 502 to step 504 where it is determined if the size of the datum feature is one of the components in the loop equation. In step 504, if size is one of the components, the method then moves to step 506 where it is determined if the datum is primary, secondary or tertiary. If the datum is secondary or tertiary, the method moves to step 508 where VC/AME shift is determined:

$$|a_i|(0+/-\text{GeoTol}_i/2)$$

Next, from step 508, the method then moves to step 510 where it is determined if the datum feature is external or internal and at MMC or at LMC.

Referring back to step 506, if the datum is primary, the method moves to step 512 where it is determined if the datum is controlled with axis straightness, center plane straightness, or center plane flatness. If the datum is controlled with axis straightness, center plane straightness, or center plane flatness, the method then moves to step 508 where VC/AME shift is determined. However, if the datum is not controlled with axis straightness, center plane straightness, or center plane flatness, the method moves to step 510.

In step 510, if it is determined that the datum feature is external and at MMC or internal and at LMC, the method moves to step 514 where the feature's mean (this is the size feature associated with the material condition modifier) is decreased by:

$$[(\text{PlusTol}_i+\text{MinusTol}_i)/2)$$

Next, in step 516, the feature's tolerance is adjusted by:

$$+/-(\text{PlusTol}_i+\text{MinusTol}_i)/2)]$$

The method then moves from step 516 to step 320 where it is determined if more material condition modifiers must be defined.

However, in step 510 it is determined that the datum feature is external and at LMC or internal and at MMC, the method moves to step 518 where the feature's mean (this is the size feature associated with the material condition modifier) is increased by:

$$[(\text{PlusTol}_i+\text{MinusTol}_i)/2)$$

Next, the method moves to step 516 where the feature's tolerance is adjusted.

Referring back to step 502, if it is determined that two components are referenced to the datum, the method moves from step 502 to step 530 where it is determined if the components are referenced simultaneously or separately to the datum. If it is determined that the components are referenced simultaneously, the method then moves to step 320 (FIG. 4).

However, in step 530, if it is determined that the components are referenced separately, the method moves to step 534 where it is determined if the datum is primary, secondary, or tertiary. If the datum is secondary or tertiary, the method moves to step 540 where:

$$\text{Datum shift}=|a_i|[0+/-(\text{PlusTol}_i+\text{MinusTol}_i+\text{GeoTol}_i)/2]$$

Next, in step 320 (FIG. 4), it is determined if more material condition modifiers must be defined.

However, in step 534, if it is determined that the datum is primary, then the method moves to step 536 where it is determined if the datum is controlled with axis straightness, center plane straightness, or center plane flatness. If it is not determined that the datum is controlled with axis straightness, center plane straightness, or center plane flatness, the method moves to step 532 where the datum is shifted by:

$$\text{Datum shift}=|a_i|[0+/-(\text{PlusTol}_i+\text{MinusTol}_i)/2]$$

However, in step 536, if it is determined that the datum is controlled with axis straightness, center plane straightness, or center plane flatness, the method moves to step 540. Next, the method moves to step 320 (FIG. 4). In step 504, if it is determined that the size of the datum feature is not one of the components in the loop equation, the method moves from step 504 to step 534 where it is determined if the datum is primary, secondary, or tertiary.

Referring back to step 152, the variation controls are applied to all the features. Once all of the variation controls are applied, the method moves to step 154 where it is determined whether this is an analysis or an allocation. This was determined earlier in the methodology (step 120). If it is determined that this is an analysis, the method moves from step 154 to step 180 where a requirement variation is calculated. To determine this variation, various calculations are made dependent upon the type of analysis conducted. For a WC analysis, the following formula is utilized:

$$t_{wc}=\sum_{i=1}^{n}|a_it_i|+\sum_{m=1}^{r}|a_mt_m|$$

For an RSS analysis, the following formula is utilized:

$$t_{rss}=\left[\sum_{i=1}^{n}(a_i t_i)^2+\sum_{m=1}^{r}(a_m t_m)^2\right]^{1/2}$$

For MRSS analysis, the following formula is utilized:

$$t_{mrss}=C_f\left[\sum_{i=1}^{n}(a_i t_i)^2+k\sum_{i=1}^{r}(a_m t_m)^2\right]^{1/2}$$

Once the gap variation is calculated in step 180, the method moves to step 182 where it is determined if the assembly requirement in step 100 has been met. If it is determined that the assembly requirement has been met, the method then moves to step 184 where variation controls and tolerances are applied to the features.

However, if it is determined that the assembly requirements have not been met, the method moves from step 182 to step 186 where the mean/nominal value of the $i^{th}$ component ($d_i$) may be adjusted to meet the requirement. If the $d_i$ can be adjusted to meet the requirement, the method moves to step 184.

However, if the $d_i$ cannot be adjusted to meet the requirement, the method moves to step 188 where the variable tolerances may be resized. Utilizing RSS analysis, the formulas necessary to resize the variable tolerances are:

$$F_{rss}=\left[\frac{(\mu_{assy}-g_m)^2-\sum_{j=1}^{p}(a_j t_j)^2}{\sum_{k=1}^{q}(a_k w_k t_k)^2}\right]^{1/2}$$

$$t_{k,rss,resized}=F_{rss}t_k$$

For WC analysis, the formulas necessary to resize the variable tolerances are:

$$t_{k,wc,resized}=F_{wc}t_k$$

$$F_{wc}=\frac{|\mu_{assy}-g_m|-\sum_{j=1}^{p}|a_j t_j|}{\sum_{k=1}^{q}|a_k w_k t_k|}$$

For MRSS analysis, the following formulas may be used to resize the variable tolerances:

$$F_{mrss}=\frac{-b+/-\sqrt{b^2-4ac}}{2a}\qquad t_{k,mrss,resized}=F_{mrss}t_k$$

-continued $$a=0.25\left(\sum_{k=1}^{q}a_k w_k t_k\right)^2-2.25\sum_{k=1}^{q}(a_k w_k t_k)^2+3\sqrt{n}\sum_{k=1}^{q}(a_k w_k t_k)^2-n\sum_{k=1}^{q}(a_k w_k t_k)^2$$

$$b=0.5\sum_{k=1}^{q}(a_k w_k t_k)\sum_{j=1}^{p}(a_j t_j)+\left(\sum_{k=1}^{q}a_k w_k t_k\right)(\mu_{assy}-g_m)-\sqrt{n}\left(\sum_{k=1}^{q}a_k w_k t_k\right)(\mu_{assy}-g_m)$$

$$c=0.25\left(\sum_{j=1}^{p}a_j t_j\right)^2+(\mu_{assy}-g_m)^2-2\sqrt{n}(\mu_{assy}-g_m)^2+n(\mu_{assy}-g_m)^2+\left(\sum_{j=1}^{p}a_j t_j\right)(\mu_{assy}-g_m)-\sqrt{n}\left(\sum_{j=1}^{p}a_j t_j\right)(\mu_{assy}-g_m)-2.25\sum_{j=1}^{p}(a_j t_j)^2+3\sqrt{n}\sum_{j=1}^{p}(a_j t_j)^2-n\sum_{j=1}^{p}(a_j t_j)^2$$

The above discussed equations are only valid when material modifiers are not used. If material condition modifiers are utilized, an iterative process must be used to resize tolerances. After step 188, if the variable tolerances are resized, the method moves to step 180. However, if the variable tolerances cannot be resized, the method moves to step 190 where it is determined if the assembly can be redesigned.

In step 190, if it is determined that the assembly cannot be redesigned, the method moves to step 184 where variation controls and tolerances are applied to features. However, in step 190, if it is determined the assembly can be redesigned, the method moves back to step 100 where the assembly requirement is redefined.

Figure 7:
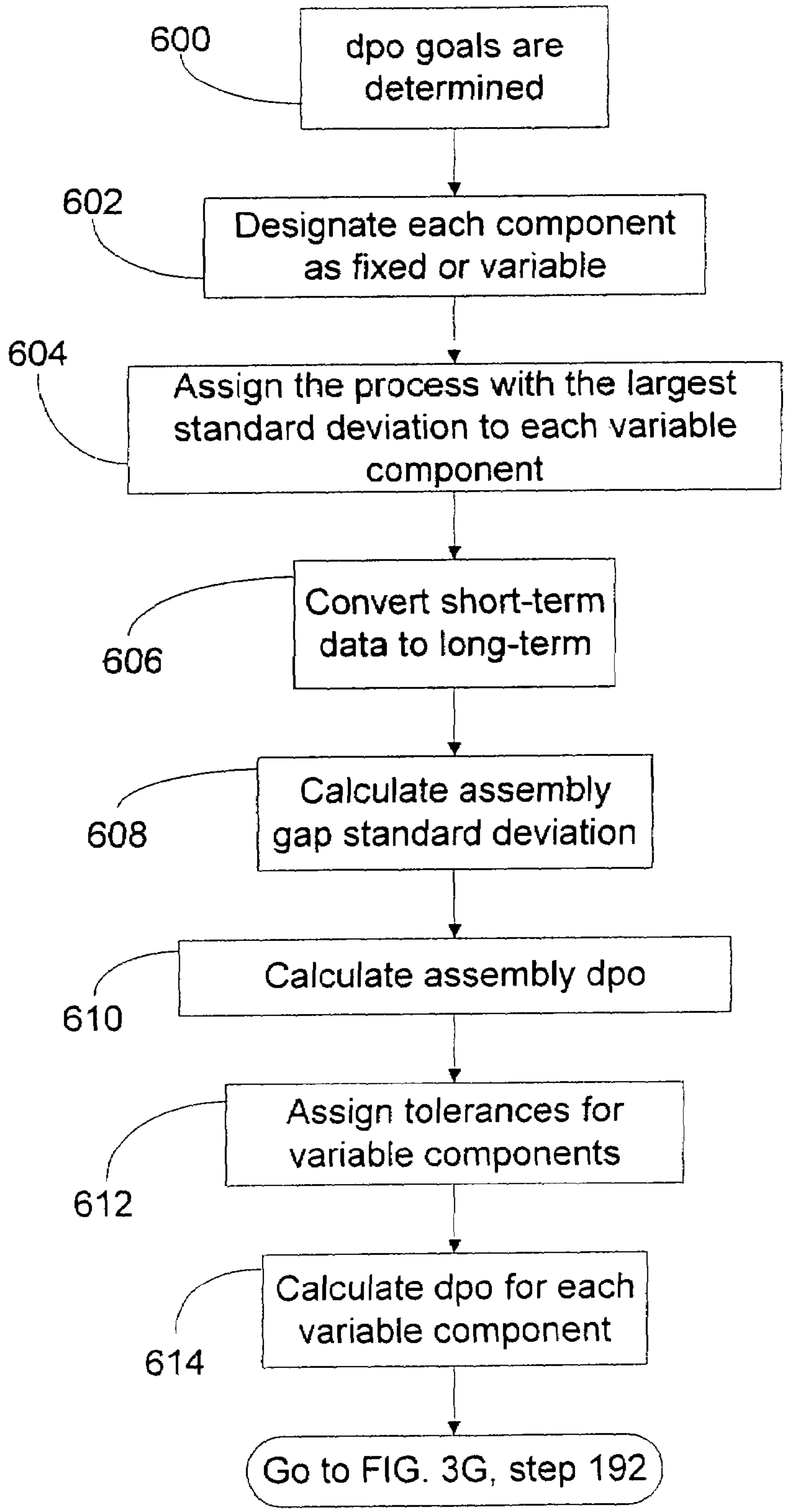
FIG. 7 is a flow chart illustrating the steps for assigning tolerances to components and calculate dpos according to the teachings of the present invention.

Referring back to step 154, if this is an allocation, the method moves to FIG. 7 (step 600) where defects per opportunity (dpo) goals are determined. FIG. 7 is a flow chart illustrating the steps for assigning tolerances to components and calculating dpos. In step 600, dpo goals are determined. Next, in step 602, each component is designated as fixed or variable. In step 604, each variable component is assigned the process with the largest standard deviation, $\sigma_i$. Next, in step 606, if the data is short term, it is converted to long term for WC, statistical and RSS. SRSS is not converted. In addition, there is a default of $w_i$=1.29 and $k_i$=0. The following formula is utilized:

$$\sigma_{i,LT}=\left(\frac{1}{1-k_i}\right)w_i\sigma_{i,ST}$$

Next, in step 608, the assembly requirement standard deviation is calculated.

For WC, $\sigma_{Assy}$ is not calculated.

For statistical and RSS, the following formula is utilized:

$$\sigma_{Assy,LT} = \left[\sum_{i=1}^{n} (a_i \sigma_{i,LT})^2\right]^{1/2}$$

For SRSS, the following formula is utilized:

$$\sigma_{Assy,ST} = \left[\sum_{i=1}^{n} (a_i \sigma_{i,ST})^2\right]^{1/2}$$

The method then moves to step 610 where the assembly dpo ($dpo_{Assy}$) is calculated. For WC, the dpo equals zero. For statistical and RSS, the following formulas are used:

$$Z_U = \frac{\left[(USL - \mu_{Assy})^2 - \sum_{j=1}^{p} (a_j t_j)^2\right]^{1/2}}{\sigma_{Assy,LT}}$$

$$Z_L = \frac{\left[(\mu_{Assy} - LSL)^2 - \sum_{j=1}^{p} (a_j t_j)^2\right]^{1/2}}{\sigma_{Assy,LT}}$$

The $dpo_{Assy}$ are determined from $Z_U$ and $Z_L$.

SRSS utilizes the following formulas:

$$Z_{U,+} = \frac{\left[\left(USL - \mu_{Assy} - 1.5\sum_{k=1}^{q} |a_k \sigma_k|\right)^2 - \sum_{j=1}^{p} (a_j t_j)^2\right]^{1/2}}{\sigma_{Assy,ST}}$$

$$Z_{L,-} = \frac{\left[\left(\mu_{Assy} - LSL - 1.5\sum_{k=1}^{q} |a_k \sigma_k|\right)^2 - \sum_{j=1}^{p} (a_j t_j)^2\right]^{1/2}}{\sigma_{Assy,ST}}$$

$$Z_{L,+} = \frac{\left[\left(\mu_{Assy} - LSL + 1.5\sum_{k=1}^{q} |a_k \sigma_k|\right)^2 - \sum_{j=1}^{p} (a_j t_j)^2\right]^{1/2}}{\sigma_{Assy,ST}}$$

$$Z_{U,-} = \frac{\left[\left(USL - \mu_{Assy} + 1.5\sum_{k=1}^{q} |a_k \sigma_k|\right)^2 - \sum_{j=1}^{p} (a_j t_j)^2\right]^{1/2}}{\sigma_{Assy,ST}}$$

The $dpo_{Assy}$ are determined from $Z_{L,-}$, $Z_{L,+}$ and $Z_{U,-}$, $Z_{U,+}$ Next, in step 612, tolerances are assigned to variable components. For WC, the following formula is used:

$$t_i = \min\left[\left(\frac{USL - \mu_{Assy} - \sum_{j=1}^{p} |a_j t_j|}{\sum_{k=1}^{q} |a_k \sigma_{k,LT}|}\right), \left(\frac{\mu_{Assy} - LSL - \sum_{j=1}^{p} |a_j t_j|}{\sum_{k=1}^{q} |a_k \sigma_{k,LT}|}\right)\right]\sigma_{i,LT}$$

For statistical allocation, the following is used:

$t_i = 4.5\sigma_{i,LT}$ (1 sided spec)

$t_i = 4.65\sigma_{i,LT}$ (2 sided spec)

For RSS:

$$t_i = \min(Z_L, Z_U)\sigma_{i,LT}$$

For SRSS:

$t_i$ where $dpo_i = dpo_{Assy}$

Next, in step 614, the dpo for each variable component is calculated. For WC:

$$Z_i = \frac{t_i}{\sigma_{i,LT}}$$

$dpo_i$ is determined from $Z_i$.

For statistical allocation:

3.4E−6

For RSS:

$$Z_i = \min(Z_L, Z_U)$$

$dpo_i$ is determined from $Z_i$

For SRSS:

$dpo_i = dpo_{Assy}$

The method then goes from step 614 back to FIG. 3, step 192 where it is determined if the dpo goals have been fulfilled. If the goals have been fulfilled, the method moves to step 184. However, if the dpo goals have not been met, the method moves to step 194 where it is determined whether $d_i$ can be adjusted to increase the assembly requirement. If $d_i$ can be adjusted, the method moves to step 100 where the assembly requirement is defined. However, in step 194, if it is determined that an adjustment of $d_i$ does not increase the assembly requirement, the method moves to step 196 where it is determined if new processes are available. If new processes are available, the method moves to step 198 where new processes are selected. Next, the method then moves to step 600. However, if new processes are not available, the method moves from step 196 to step 190 where it is determined if the product should be redesigned.

The following is a glossary of terms and abbreviations referenced within the specification:

1.5 sigma shift: a shift of the process mean that is equal to 1½ standard deviations for the process $a_i$: sensitivity the ith component $a_j$: sensitivity the jth, fixed component $a_k$: sensitivity the kth, variable component $a_m$: sensitivity mth material modifier Allocation: Tolerance allocation starts with an expected variation at an assembly gap and derives tolerances to meet the expected gap variation AME: Actual mating envelope Analysis: Tolerance analysis starts with assigned tolerances and calculates the variation at the assembly gap $C_f$: correction factor used in the MRSS equation.

Component: One of the inputs to the analysis/allocation

Controlled feature: The feature being controlled by the feature control frame.

Datum feature: The datum in the feature control frame

Datum shift: Term that considers the shift caused by the virtual condition size of a datum dims: dimensions dpo: number of defects per opportunity $dpo_i$: dpo for the $i^{th}$ component $dpo_{ASSY}$: dpo for the gap (assembly requirement)

$d_i$:the mean/nominal value of the $i^{th}$ component

DRF: Datum reference frame

External: Type of feature, such as a pin, boss, etc.

Ext: External $F_{wc}$: Resize factor for the Worst Case model $F_{rss}$: Resize factor for the RSS model $F_{mrss}$: Resize factor for the MRSS model FCF: Feature control frame Feature shift: Term that considers the shift of a controlled feature when the feature size in not in the loop equation.

Fixed (Fixed Component): Component that cannot be changed

Geo $tol_i$: The tolerance in the feature control frame of the $i^{th}$ component $g_m$: Assembly requirement specification that is closer to the mean value Internal: Type of feature, such as a hole, slot, etc.

Int: Internal $k_i$: Factor that considers mean shift of the $i^{th}$ component and relates Cp and Cpk ($k_i$=1+Cpk/Cp)

LMC: Least material condition

LSL: Lower specification limit m: The number of material modifier components

Minus $tol_i$: The negative tolerance value of the $i^{th}$ component

MMC: Abbreviation for maximum material condition.

MRSS: Modified root sum of the squares.

$\mu_{Assy}$: The mean value at the gap (assembly requirement)

n: The number of independent components (components)

p: The number of fixed components

P: The assembly (gap) requirement

Plus $tol_i$: The positive tolerance value of the $i_{th}$ component

Pri: Primary

Process: Manufacturing process q: The number of variable components r: the number of incremental tolerances due to material condition modifiers RFS: Regardless of feature size.

RSS: Root sum of the squares

Sec: Secondary

Sensitivity: Factor that defines the direction and magnitude

Sep: Separate

Sim: Simultaneous

SRSS: Static root sum of the squares.

Stat: Statistical $\sigma_{Assy}$: Standard deviation for the gap (assembly requirement)

$\sigma_{Assy,LT}$: Long-term standard deviation for the gap (assembly requirement)

$\sigma_{Assy,ST}$: Short-term standard deviation for the gap (assembly requirement)

$\sigma_{i,LT}$: long-term standard deviation for the $i^{th}$ component $\sigma_{i,LT}$: long-term standard deviation for the $i^{th}$ component $\sigma_{k,LT}$: short-term standard deviation for the $k^{th}$ component Ter: Tertiary $t_i$: Equal bilateral tolerance of the $i^{th}$ component $t_j$: Equal bilateral tolerance of the $j^{th}$ fixed component $t_k$: Equal bilateral tolerance of the $k^{th}$ variable component $t_{k,wc,resized}$: Equal bilateral tolerance of the $k^{th}$ variable component after resizing using the Worst Case model $t_{k,rss,resized}$: Equal bilateral tolerance of the $k^{th}$ variable component after resizing using the RSS model $t_{k,mrss,resized}$: Equal bilateral tolerance of the $k^{th}$ variable component after resizing using the MRSS model $t_m$: Equal bilateral tolerance of the $m^{th}$ material modifier component $t_{wc}$: Maximum expected variation of the requirement (equal bilateral tolerance) using the Worst Case model.

$t_{mrss}$: Expected variation of the requirement (equal bilateral tolerance) using the MRSS model $t_{rss}$: Expected variation of the requirement (equal bilateral tolerance) using the RSS model.

USL: Upper specification limit

Variable component: Component (dimension/tolerance) that can be changed

Variable tolerance: Tolerance that can be changed

Variation controls: The tolerance or FCF used to control the amount a component is allowed to depart from an ideal value.

VC: Virtual condition

VC/AME shift: Term that considers the shift caused by the virtual condition size or the actual mating envelope size.

WC: Worst case $w_i$: Weight factor for the $i^{th}$ component $w_k$: Weight factor for the $k^{th}$ variable component $Z_i$: The standard normal deviate associated with the $i^{th}$ component.

$Z_U$: The standard normal deviate associated with the upper specification limit $Z_{U,-}$: The standard normal deviate associated with the upper specification limit when shifted in the negative direction $Z_{U,+}$: The standard normal deviate associated with the upper specification limit when shifted in the positive direction $Z_L$: The standard normal deviate associated with the lower specification limit $Z_{l,-}$: The standard normal deviate associated with the lower specification limit when shifted in the negative direction $Z_{L,+}$: The standard normal deviate associated with the lower specification limit when shifted in the negative direction The discussed methodology may be utilized by the computing system 14, where logic is embedded within the memory 22 to perform the steps as discussed above. The database 20 provides information on the variation controls, appropriate placement, syntax, etc. The engineer 12 may utilize the computing system to determine the appropriate tolerance analysis. In an alternate embodiment of the present invention, the method may be conducted without an aid of a computing system (e.g., completed manually by design engineer).

The present invention provides many advantages over existing systems and methods. The present invention provides a structured path for determining tolerances without utilizing wasteful iterative methods. In addition, the present invention provides a methodology for automatically and correctly determining the variation controls of a specified feature. In addition, LMC/MMC variations for the controlled/datum features may be calculated.

It is thus believed that the operation and construction of the present invention will be apparent from the foregoing description. While the system and method shown and described have been characterized as being preferred, it will be readily apparent that various changes and modifications could be made therein without departing from the scope of the invention as defined in the following claims.

What is claimed is:

1. A method of optimizing tolerances for a design and assembly of a plurality of components, said method comprising the steps of:

defining an assembly requirement;

defining datum features;

assigning component dimensions;

creating a dimensional loop diagram for each component;

determining an appropriate analysis/allocation method for determining tolerances of the plurality of components;

automatically selecting variation controls from the determined analysis/allocation method;

automatically applying variation controls, by a computer, to features of the plurality of components; and assigning tolerances to features of the plurality of components.

2. The method of optimizing tolerances for a design of claim 1 wherein the step of applying variation controls for the plurality of components includes defining feature material condition modifiers.

3. The method of optimizing tolerances for a design of claim 2 wherein said step of defining feature material condition modifiers includes assigning a geometric control at a maximum material condition when a feature of one of the components requires a boundary of air.

4. The method of optimizing tolerances for a design of claim 2 wherein said step of defining feature material modifiers includes assigning a geometric control at a least material condition when a feature of one of the components requires a boundary of material.

5. The method of optimizing tolerances for a design of claim 2 wherein said step of defining material condition modifiers includes calculating effects of a least material condition or a maximum material condition on a controlled feature of one of the components.

6. The method of optimizing tolerances for a design of claim 5 wherein said step of calculating effects of a least material condition or maximum material condition modifier of the controlled feature includes:

determining if the controlled feature is external or internal and at maximum materia condition or least material condition;

upon determining that the controlled feature is external and at maximum material condition or internal and at least material condition, decreasing a mean of the controlled feature by:

$$[(PlusTol_i+MinusTol_i)/2)]$$

where $PlusTol_i$=a positive tolerance value of the feature associated with the material condition modifier; and $MinusTol_i$=a negative tolerance value of the feature associated with the material condition modifier.

7. The method of optimizing tolerances for a design of claim 6 where the controlled feature's tolerance is adjusted by:

$$+/-[(PlusTol_i+MinusTol_i)/2].$$

8. The method of optimizing tolerances for a design of claim 5 wherein said step of calculating the effects of a least material condition or maximum material condition modifier of the controlled feature includes:

determining if the controlled feature is external or internal and at maximum material condition or least material condition;

upon determining that the controlled feature is external and at least material condition or internal and at maximum material condition, decreasing a mean of the control feature by:

$$[(PlusTol_i+MinusTol_i)/2]$$

where $PlusTol_i$=a positive tolerance value of the feature associated with the material condition modifier; and $MinusTol_i$=a negative tolerance value of the feature associated with the material condition modifier.

9. The method of optimizing tolerances for a design of claim 8 where the controlled feature's tolerance is adjusted by:

$$+/-[(PlusTol_i+MinusTol_i)/2].$$

10. The method of optimizing tolerances for a design of claim 5 wherein said step of calculating effects of a least material condition or maximum material condition modifier includes shifting the controlled feature by:

$$|a_i|[0+/-(PlusTol_i+MinusTol_i)/2]$$

where $a_i$=sensitivity of the $i^{th}$ axis/center plane/center point component of the controlled feature;

$PlusTol_i$=a positive tolerance value of the feature associated with the material condition modifier; and $MinusTol_i$=a negative tolerance value of the feature associated with the material condition modifier.

11. The method of optimizing tolerances for a design of claim 2 wherein said step of defining material modifiers includes the step of calculating effects of a least material condition or a maximum material condition modifier of a datum feature of one of the components.

12. The method of optimizing tolerances for a design of claim 11 wherein said step of calculating the effects of a least material condition or a maximum material condition modifier includes:

determining if the plurality of components are referenced simultaneously to the datum feature; and upon determining that the plurality of components are referenced simultaneously to the datum feature by not shifting the datum.

13. The method of optimizing tolerances for a design of claim 11 wherein said step of calculating effects of a least material condition or a maximum material modifier condition includes:

determining if the plurality of components are referenced separately or simultaneously to the datum feature;

upon determining that the plurality of components are referenced separately, determining if the datum is primary, secondary, or tertiary;

upon determining that the datum is primary, determining if the datum is controlled with axis straightness, center plane straightness, or center plane flatness; and upon determining that the datum is controlled with axis straightness, center plane straightness, or center plane flatness, shifting the datum by:

$$|a_i|[0+/-(PlusTol_i+MinusTol_i+GeoTol_i)/2]$$

where $a_i$=sensitivity of the $i^{th}$ axis/center plane/center point component of the datum feature;

$PlusTol_i$=a positive tolerance value of the datum feature;

$MinusTol_i$=a negative tolerance value of the datum feature; and $GeoTol_i$=a tolerance in a feature control frame of the datum feature.

14. The method of optimizing tolerances for a design of claim 11 wherein said step of calculating effects of a least material condition or a maximum material modifier condition includes:

determining if the plurality of components are referenced separately to the datum feature;

upon determining that the plurality of components are referenced separately, determining if the datum is primary, secondary, or tertiary;

upon determining that the datum is primary, determining if the datum is controlled with axis straightness, center plane straightness, or center plane flatness; and upon determining that the datum is not controlled with axis straightness, center plane straightness, or center plane flatness, shifting the datum by:

$$|a_i|[0+/-(PlusTol_i+MinusTol_i)/2]$$

where $a_i$=sensitivity of the $i^{th}$ axis/center plane/center point component of the datum feature;

$PlusTol_i$=a positive tolerance value of the datum feature; and $MinusTol_i$=a negative tolerance value of the datum feature.

15. The method of optimizing tolerances for a design of claim 11 wherein said step of calculating effects of a least material condition or a maximum material modifier condition includes:

determining if the plurality of components are referenced separately to the datum feature;

upon determining that the plurality of components are referenced separately, determining if the datum is primary, secondary, or tertiary;

upon determining that the datum is secondary or tertiary, shifting the datum by:

$$|a_i|[0+/-(PlusTol_i+MinusTol_i+GeoTol_i)/2]$$

where $a_i$=sensitivity of the $i^{th}$ axis/center plane/center point component of the datum feature;

$PlusTol_i$=a positive tolerance value of the datum feature;

$MinusTol_i$=a negative tolerance value of the datum feature; and $GeoTol_i$=a tolerance in a feature control frame of the datum feature.

16. The method of optimizing tolerances for a design of claim 11 wherein said step of calculating effects of a least material condition or a maximum material modifier condition includes:

determining if the datum is primary, secondary or tertiary;

upon determining that the datum is primary, determining if the datum is controlled with axis straightness, center plane straightness, or center plane flatness; and upon determining that the datum is controlled with axis straightness, center plane straightness, or center plane flatness, shifting the datum by:

$$|a_i|(0+/-GeoTol_i/2)$$

where $a_i$=sensitivity of the $i^{th}$ component of the datum feature associated with the material condition modifier; and $GeoTol_i$=a tolerance in a feature control frame of the datum feature.

17. The method of optimizing tolerances for a design of claim 16 wherein said step of calculating effects of a least material condition or a maximum material condition includes:

determining if the datum is primary, secondary or tertiary;

upon determining that the datum is primary, determining if the datum is controlled with axis straightness, center plane straightness, or center plane flatness; and upon determining that the datum is not controlled with axis straightness, center plane straightness, or center plane flatness, determining if the datum feature is external or internal and at maximum material condition or at least material condition;

upon determining that the datum feature is external and at maximum material condition or internal and at least material condition, decreasing the feature's mean by:

$$(PlusTol_i+MinusTol_i)/2; \text{ and}$$

adjusting a tolerance of the datum feature by:

$$+/-[(PlusTol_i+MinusTol_i)/2]$$

where $PlusTol_i$=a positive tolerance value of the datum feature; and $MinusTol_i$=a negative tolerance value of the datum feature.

18. The method of optimizing tolerances for a design of claim 16 wherein said step of calculating effects of a least material condition or a maximum material condition includes:

determining if the datum is primary, secondary or tertiary;

upon determining that the datum is primary, determining if the datum is controlled with axis straightness, center plane straightness, or center plane flatness; and upon determining that the datum is not controlled with axis straightness, center plane straightness, or center plane flatness, determining if the datum feature is external or internal and at maximum material condition or at least material condition; and upon determining that the datum feature is external and at least material condition or internal and at maximum material condition, increasing the feature's mean by:

$$[(PlusTol_i+MinusTol_i)/2]; \text{ and}$$

adjusting a tolerance of the feature by:

$$+/-[(PlusTol_i+MinusTol_i)/2]$$

where $PlusTol_i$=a positive tolerance value of the datum feature; and $MinusTol_i$=a negative tolerance value of the datum feature.

19. The method of optimizing tolerances for a design of claim 11 wherein said step of calculating effects of a least material condition or a maximum material condition includes:

determining if the datum is primary, secondary or tertiary;

upon determining that the datum is primary, determining if the datum is controlled with axis straightness, center plane straightness, or center plane flatness; and upon determining that the datum is controlled with axis straightness, center plane straightness, or center plane flatness, shifting the datum by:

$$|a_i|(0+/-GeoTol_i)/2$$

where $a_i$=sensitivity of the $i^{th}$ component of the datum associated with the material condition modifier; and $GeoTol_i$=a tolerance in a feature control frame of the datum feature.

20. The method of optimizing tolerances for a design of claim 2 further comprising the step, after the step of determining an appropriate analysis/allocation method for determining tolerances of the plurality of components, the steps of:

selecting a worst case analysis of the requirement;

calculating a requirement variation, wherein the variation is determined by:

$$t_{wc} = \sum_{i=1}^{n} |a_i t_i| + \sum_{m=1}^{r} |a_m t_m|$$

where
$a_i$=sensitivity of the $i^{th}$ component;
$a_m$=sensitivity of the $m^{th}$ material condition modifier;
n=number of independent components;
r=number of incremental tolerances due to material condition modifiers;
$t_i$=equal bilateral tolerance of the $i^{th}$ component;
$t_m$=equal bilateral tolerance of the $m^{th}$ material condition modifier; and
$t_{wc}$=maximum expected variation of a requirement using the worst case analysis.

21. The method of optimizing tolerances for a design of claim 2 further comprising the step, after the step of determining an appropriate analysis/allocation method for determining tolerances of the plurality of components, the steps of:
selecting a root sum of the squares analysis of the process;
calculating a requirement variation, wherein the variation is determined by:

$$t_{rss} = \left[\sum_{i=1}^{n} (a_i t_i)^2 + \sum_{m=1}^{r} (a_m t_m)^2\right]^{1/2}$$

where
$a_i$=sensitivity of the $i^{th}$ component;
$a_m$=sensitivity of the $m^{th}$ material condition modifier;
r=number of incremental tolerances due to material condition modifiers;
n=number of independent components;
$t_i$=equal bilateral tolerance of the $i^{th}$ component;
$t_m$=equal bilateral tolerance of the $m^{th}$ material condition modifier; and $t_{rss}$=maximum expected variation of the requirement using the root sum of the squares analysis.

22. The method of optimizing tolerances for a design of claim 2 further comprising the step, after the step of determining an appropriate analysis/allocation method for determining tolerances of the plurality of components, the steps of:
selecting a modified root sum of the squares analysis of the process;
calculating a requirement variation, wherein the variation is determined by:

$$t_{mrss} = C_f\left[\sum_{i=1}^{n} (a_i t_i)^2 + \sum_{m=1}^{r} (a_m t_m)^2\right]^{1/2}$$

where
$a_i$=sensitivity of the $i^{th}$ component;
$a_m$=sensitivity of the $m^{th}$ material condition modifier;
$C_f$=correction factor;
n=number of independent components;
r=number of incremental tolerances due to material condition modifiers;
$t_i$=equal bilateral tolerance of the $i^{th}$ component;
$t_m$=equal bilateral tolerance of the $m^{th}$ material condition modifier; and
$t_{mrss}$=maximum expected variation of the requirement using the modified root sum of the squares analysis.

23. The method of optimizing tolerances for a design of claim 1 wherein the step of determining an appropriate analysis/allocation method for determining tolerances of the plurality of components includes the following steps:
determining if process data is available for assembling the plurality of components;
upon determining that process data is not available, determining if the plurality of components analyzed number four or more; and
upon determining that the plurality of components are not four or more, selecting a worst case analysis.

24. The method of optimizing tolerances for a design of claim 23 wherein the step of determining an appropriate analysis/allocation method for determining tolerances of the plurality of components includes the following steps:
upon determining that the plurality of components number four or more, determining if a cost of an assembly defect is high in comparison to a cost of a component defect; and
upon determining that the cost of an assembly defect is high, selecting a worst case analysis.

25. The method of optimizing tolerances for a design of claim 24 wherein the step of determining an appropriate analysis/allocation method for determining tolerances of the plurality of components includes the following steps:
upon determining that the cost of an assembly defect is low, determining if manufacturing processes of the plurality of components are understood; and
upon determining that the manufacturing processes are understood, selecting a root sum of the squares analysis.

26. The method of optimizing tolerances for a design of claim 25 further comprising the step of, upon determining that the manufacturing processes are not understood, selecting a modified root sum of the squares analysis.

27. The method of optimizing tolerances for a design of claim 1 wherein the step of determining an appropriate analysis/allocation method for determining tolerances of the plurality of components includes the following steps:
determining if process data is available for assembling the plurality of components;
upon determining that process data is available, the step of determining if a cost of an assembly defect is high in comparison to a cost of a component defect; and
upon determining that the cost of an assembly defect is high, selecting a worst case allocation.

28. The method of optimizing tolerances for a design of claim 27 wherein the step of determining an appropriate analysis/allocation method for determining tolerances of the plurality of components includes:
upon determining that the cost of an assembly defect is low, determining if all data can be treated as short-term with a mean shift of 1.5 standard deviations; and
upon determining that all data can be treated as short-term with a mean shift of 1.5 standard deviations, selecting a static root sum squares allocation.

29. The method of optimizing tolerances for a design of claim 28 wherein the step of determining an appropriate analysis/allocation method for determining tolerances of the plurality of components includes:
upon determining that all data cannot be treated as short-term with a mean shift of 1.5 standard deviations, determining if cost of the assembly or parts is a cost driver;

upon determining that parts are the cost driver, selecting statistical allocation.

30. The method of optimizing tolerances for a design of claim 29 wherein the step of determining an appropriate analysis/allocation method for determining tolerances of the plurality of components includes upon determining that assembly costs are the cost driver, selecting root sum of squares allocation.

31. The method of optimizing tolerances for a design of claim 1 wherein:

the step of assigning tolerances to components includes:

determining defects per opportunity goal for each requirement variable;

assigning the process with a largest standard deviation to each variable component;

converting short-term data to long-term data;

calculating an assembly number of defects per opportunity from a standard normal deviate associated with an upper and lower specification limit;

assigning tolerances to a plurality of variable components; and calculating defects per opportunity for each variable component.

32. The method of optimizing tolerances for a design of claim 31 wherein:

the step of determining an appropriate analysis/allocation method for determining tolerances of the plurality of components includes selecting a worst case, statistical or root sum of the squares allocation; and the step of converting short-term data to long-term data is calculated by:

$$\sigma_{i,LT} = \left(\frac{1}{1-k_i}\right) w_i \sigma_{i,ST}$$

where $\sigma_{i,LT}$=long-term standard deviation for the $i^{th}$ component;

$k_i$=factor that considers mean shift of the $i^{th}$ component;

$\sigma_{i,ST}$=short-term standard deviation for the $i^{th}$ component; and $w_i$=weight factor for the $i^{th}$ component.

33. The method of optimizing tolerances for a design of claim 1 wherein the step of determining an appropriate analysis/allocation method for determining tolerances of the plurality of components includes selecting a statistical or root sum of the squares allocation; and further comprising the step of calculating an assembly number of defects per opportunity from a standard normal deviate associated with an upper and lower specification limit includes calculating:

$$Z_U = \frac{\left[(USL - \mu_{Assy})^2 - \sum_{j=1}^{p} (a_j t_j)^2\right]^{1/2}}{\sigma_{Assy,LT}}$$

$$Z_L = \frac{\left[(\mu_{Assy} - LSL)^2 - \sum_{j=1}^{p} (a_j t_j)^2\right]^{1/2}}{\sigma_{Assy,LT}}$$

where $a_j$=sensitivity of the $j^{th}$ fixed component;

$\mu_{Assy}$=mean value at the assembly requirement;

$\sigma_{Assy,LT}$=long-term standard deviation for the assembly requirement;

LSL=lower specification limit;

$t_j$=bilateral tolerance of the $j^{th}$ fixed component;

p=number of fixed components;

USL=upper specification limit;

$Z_U$=the standard normal deviate associated with the upper specification limit; and $Z_L$=the standard normal deviate associated with the lower specification limit.

34. The method of optimizing tolerances for a design of claim 1 wherein the step of determining an appropriate analysis/allocation method for determining tolerances of the plurality of components includes selecting a static root sum of the squares allocation; and further comprises the step of calculating an assembly number of defects per opportunity from a standard normal deviate associated with an upper and lower specification limit includes calculating:

$$Z_{U,-} = \frac{\left[\left(USL - \mu_{Assy} + 1.5\sum_{k=1}^{q} |a_k \sigma_k|\right)^2 - \sum_{j=1}^{p} (a_j t_j)^2\right]^{1/2}}{\sigma_{Assy,ST}}$$

$$Z_{U,+} = \frac{\left[\left(USL - \mu_{Assy} - 1.5\sum_{k=1}^{q} |a_k \sigma_k|\right)^2 - \sum_{j=1}^{p} (a_j t_j)^2\right]^{1/2}}{\sigma_{Assy,ST}}$$

$$Z_{L,+} = \frac{\left[\left(\mu_{Assy} - LSL + 1.5\sum_{k=1}^{q} |a_k \sigma_k|\right)^2 - \sum_{j=1}^{p} (a_j t_j)^2\right]^{1/2}}{\sigma_{Assy,ST}}$$

$$Z_{L,-} = \frac{\left[\left(\mu_{Assy} - LSL - 1.5\sum_{k=1}^{q} |a_k \sigma_k|\right)^2 - \sum_{j=1}^{p} (a_j t_j)^2\right]^{1/2}}{\sigma_{Assy,ST}}$$

where $a_j$=sensitivity of the $j^{th}$ fixed component;

$a_k$=sensitivity of the $k^{th}$ fixed component;

$\mu_{Assy}$=mean value at the assembly requirement $\sigma_{Assy,ST}$=short-term standard deviation for the assembly requirement;

$\sigma_{Assy,LT}$=long-term standard deviation for the assembly requirement;

p=number of fixed components;

$t_j$=Equal bilateral tolerance of the $j_{th}$ fixed component;

LSL=lower specification limit;

USL=upper specification limit;

p=number of fixed components;

q=number of variable components;

$Z_U$=the standard normal deviate associated with the upper specification limit; and $Z_L$=the standard normal deviate associated with the lower specification limit.

35. A method for applying variation controls for a feature of a component in an assembly of a plurality of components through a decision matrix stored within a computer for determining appropriate variation controls, said method comprising the steps of:

inputting a feature, controlled element of the feature, a tolerance zone shape and a relationship of tolerance zone to a datum reference frame into the decision matrix; and automatically determining by a computer, through the decision matrix, a variation control utilizing inputted information for automatically selecting and applying an appropriate variation control.

36. The method for applying variation controls for a feature of a component of claim 35 wherein the computer determines and applies the appropriate variation control by accessing the decision matrix.

37. The method for applying variation controls for a feature of claim 36 wherein a computer automatically determines a variation control utilizing information provided by the user.

38. A system for automatically applying variation controls of a feature of a component in an assembly of a plurality of components, said system comprising:

a computer system for calculating and determining variation controls of the feature;

a user interface for a user to input data relevant for determining variation controls of the feature; and a memory for storing information applicable for applying variation controls;

whereby the user inputs all relevant data of the feature through the user interface to the computer system, said computer system automatically calculating an appropriate variation control based upon a specific determined analysis/allocation method associated with the feature and applying the calculated variation control in an appropriate location determined by the computer system.

* * * * *